(12) United States Patent
Zhang et al.

(10) Patent No.: US 12,331,414 B2
(45) Date of Patent: Jun. 17, 2025

(54) METHODS AND APPARATUS FOR PERFORMING ELECTROLYTIC CONVERSION

(71) Applicant: THE UNIVERSITY OF BRITISH COLUMBIA, Vancouver (CA)

(72) Inventors: Zishuai Zhang, Vancouver (CA); Curtis P. Berlinguette, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 0 days.

(21) Appl. No.: 18/262,351

(22) PCT Filed: Jan. 21, 2022

(86) PCT No.: PCT/CA2022/050094
§ 371 (c)(1),
(2) Date: Jul. 20, 2023

(87) PCT Pub. No.: WO2022/155754
PCT Pub. Date: Jul. 28, 2022

(65) Prior Publication Data
US 2024/0076785 A1 Mar. 7, 2024

Related U.S. Application Data

(60) Provisional application No. 63/140,176, filed on Jan. 21, 2021.

(51) Int. Cl.
*C25B 1/02* (2006.01)
*C25B 1/23* (2021.01)
(Continued)

(52) U.S. Cl.
CPC ............. *C25B 9/23* (2021.01); *C25B 1/02* (2013.01); *C25B 3/07* (2021.01); *C25B 3/26* (2021.01);
(Continued)

(58) Field of Classification Search
CPC ..... C25B 1/23; C25B 3/03; C25B 3/07; C25B 3/26; C25B 1/02; C25B 3/23; C25B 3/25
(Continued)

(56) References Cited

U.S. PATENT DOCUMENTS 10,329,676 B2    6/2019   Kaczur et al.
2010/0200419 A1  8/2010   Gilliam et al.

FOREIGN PATENT DOCUMENTS

WO     2015184388 A1     12/2015
WO     2019051609 A1     3/2019
WO     WO-2019204938 A1 * 10/2019  ......... B01D 53/1475

OTHER PUBLICATIONS

Ma et al., "Electrochemical Reduction of CO2 in Proton Exchange Membrane Reactor: The Function of Buffer Layer," Industrial & Engineering Chemistry Research (Sep. 20, 2017), vol. 56, No. 37, pp. 10242-10250. (Year: 2017).*

(Continued)

*Primary Examiner* — Edna Wong
(74) *Attorney, Agent, or Firm* — Oyen Wiggs Green & Mutala LLP

(57) ABSTRACT

Methods and apparatuses for converting carbon dioxide to useful compounds are disclosed. The method involves reducing bicarbonate solution in an electrolyzer. Bicarbonate solution is supplied to the cathode. The direct reduction of bicarbonate at the cathode may be coupled with an oxidation reaction at the anode. The oxidation reaction may provide a source of protons ($H^+$) to cathode for the reduction of bicarbonate. The oxidation reaction may be a hydrogen oxidation reaction (HOR). Hydrogen gas ($H_2$) may be supplied to the anode. In some embodiments, a source of gas may be supplied to the bicarbonate solution to form a pressurized solution before supplying the solution to the cathode.

16 Claims, 20 Drawing Sheets

(51) Int. Cl.
| | |
|---|---|
| C25B 3/03 | (2021.01) |
| C25B 3/07 | (2021.01) |
| C25B 3/23 | (2021.01) |
| C25B 3/25 | (2021.01) |
| C25B 3/26 | (2021.01) |
| C25B 9/23 | (2021.01) |
| C25B 11/032 | (2021.01) |
| C25B 11/065 | (2021.01) |
| C25B 11/081 | (2021.01) |
| C25B 15/08 | (2006.01) |

(52) U.S. Cl.
CPC .......... *C25B 11/032* (2021.01); *C25B 11/065* (2021.01); *C25B 11/081* (2021.01); *C25B 15/083* (2021.01)

(58) Field of Classification Search
USPC ....... 205/439, 440, 450, 455, 462, 555, 457, 205/637
See application file for complete search history.

(56) References Cited

OTHER PUBLICATIONS

Li et al., "Electrolytic Conversion of Bicarbonate Into CO in a Flow Cell," Joule (Jun. 19, 2019), vol. 3, No. 6, pp. 1487-1497. (Year: 2019).*
Parnamae, R. et al., "Biopolar membranes: A review on principles, latest developments, and applications", Journal of Membrane Science 617 (2021) 118538.
Asefa, T. et al., "A CO2/H2 Fuel Cell: Reducing CO2 while Generating Electricity", J. Mater. Chem. A, 2020, DOI: 10.1039/D0TA02855J.
Weekes, D. M., Salvatore, D. A., Reyes, A., Huang, A. & Berlinguette, C. P. Electrolytic CO2 Reduction in a Flow Cell. Acc. Chem. Res. 51, 910-918 (2018).
Whipple, D. T. & Kenis, P. J. A. Prospects of CO2 Utilization via Direct Heterogeneous Electrochemical Reduction. J. Phys. Chem. Lett. 1, 3451-3458 (2010).
Hori, Y. Electrochemical CO2 Reduction on Metal Electrodes. in Modern Aspects of Electrochemistry (eds. Vayenas, C. G., White, R. E. & Gamboa-Aldeco, M. E.) 89-189 (Springer New York, 2008).
Nitopi, S. et al. Progress and Perspectives of Electrochemical CO2 Reduction on Copper in Aqueous Electrolyte. Chem. Rev. 119, 7610-7672 (2019).
Salvatore, D. & Berlinguette, C. P. Voltage Matters When Reducing CO2 in an Electrochemical Flow Cell. ACS Energy Letters 5, 215-220 (2019).
Spurgeon, J. M. & Kumar, B. A comparative technoeconomic analysis of pathways for commercial electrochemical CO2 reduction to liquid products. Energy Environ. Sci. 11, 1536-1551 (2018).
Jouny, M., Luc, W. & Jiao, F. General Techno-Economic Analysis of CO2 Electrolysis Systems. Ind. Eng. Chem. Res. 57, 2165-2177 (2018).
De Luna, P. et al. What would it take for renewably powered electrosynthesis to displace petrochemical processes? Science 364, eaav3506 (2019).
Arquer, F. P. G. de et al. CO2 electrolysis to multicarbon products at activities greater than 1 A cm-2. Science 367 661-666 (2020).
Zhang, X. et al. Molecular engineering of dispersed nickel phthalocyanines on carbon nanotubes for selective CO2 reduction. Nature Energy (2020) doi:10.1038/s41560-020-0667-9.
Chen, X. et al. Electrochemical CO2-to-ethylene conversion on polyamine-incorporated Cu electrodes. Nature Catalysis (2020) doi:10.1038/s41929-020-00547-0.
Ren, S. et al. Molecular electrocatalysts can mediate fast, selective CO2 reduction in a flow cell. Science 365, 367-369 (2019).
Chen, Y. et al. A Robust, Scalable Platform for the Electrochemical Conversion of CO2 to Formate: Identifying Pathways to Higher Energy Efficiencies. ACS Energy Lett. 5, 1825-1833 (2020).
Endrődi, B. et al. High carbonate ion conductance of a robust PiperION membrane allows industrial current density and conversion in a zero-gap carbon dioxide electrolyzer cell. Energy Environ. Sci. 13, 4098-4105 (2020).
Keith, D. W., Holmes, G., St. Angelo, D. & Heidel, K. A Process for Capturing CO2 from the Atmosphere. Joule 2, 1573-1594 (2018).
Smith, W. A., Burdyny, T., Vermaas, D. A. & Geerlings, H. Pathways to Industrial-Scale Fuel Out of Thin Air from CO2 Electrolysis. Joule 3, 1822-1834 (2019).
Luyben, W. L. Capital cost of compressors for conceptual design. Chemical Engineering and Processing—Process Intensification 126, 206-209 (2018).
Larrazábal, G. O. et al. Analysis of Mass Flows and Membrane Cross-over in CO2 Reduction at High Current Densities in an MEA-Type Electrolyzer. ACS Appl. Mater. Interfaces 11, 41281-41288 (2019).
Ma, M. et al. Insights into the carbon balance for CO2 electroreduction on Cu using gas diffusion electrode reactor designs. Energy Environ. Sci. 13, 977-985 (2020).
Rabinowitz, J. A. & Kanan, M. W. The future of low-temperature carbon dioxide electrolysis depends on solving one basic problem. Nat. Commun. 11, 5231 (2020).
Jeng, E. & Jiao, F. Investigation of CO2 single-pass conversion in a flow electrolyzer. Reaction Chemistry & Engineering 5, 1768-1775 (2020).
Welch, A. J., Dunn, E., DuChene, J. S. & Atwater, H. A. Bicarbonate or Carbonate Processes for Coupling Carbon Dioxide Capture and Electrochemical Conversion. ACS Energy Letters 5, 940-945 (2020).
Li, T. et al. Electrolytic Conversion of Bicarbonate into CO in a Flow Cell. Joule 3, 1487-1497 (2019).
Lees, E. W. et al. Electrodes Designed for Converting Bicarbonate into CO. ACS Energy Letters 5, 2165-2173 (2020).
Zhang, Z. et al. pH Matters When Reducing CO2 in an Electrochemical Flow Cell. ACS Energy Lett. 5, 3101-3107 (2020).
Li, T., Lees, E. W., Zhang, Z. & Berlinguette, C. P. Conversion of Bicarbonate to Formate in an Electrochemical Flow Reactor. ACS Energy Lett. 2624-2630 (2020).
Ripatti, D. S., Veltman, T. R. & Kanan, M. W. Carbon Monoxide Gas Diffusion Electrolysis that Produces Concentrated C2 Products with High Single-Pass Conversion. Joule 3, 240-256 (2019).
Li, Y. C. et al. Electrolysis of CO2 to Syngas in Bipolar Membrane-Based Electrochemical Cells. ACS Energy Lett. 1, 1149-1153 (2016).
Zhang, Z. et al. Metallic Porous Electrodes Enable Efficient Bicarbonate Electrolysis. doi: 10.26434/chemrxiv.12891071.v1 (2020).
Li, Y. C. et al. CO2 Electroreduction from Carbonate Electrolyte. ACS Energy Lett. 4, 1427-1431 (2019).
Luo, J. et al. Bipolar membrane-assisted solar water splitting in optimal pH. Advanced Energy Materials 6, 1600100 (2016).
Na, J. et al. General technoeconomic analysis for electrochemical coproduction coupling carbon dioxide reduction with organic oxidation. Nature Communications 10, 5193 (2019).
Han, X. et al. Electrocatalytic Oxidation of Glycerol to Formic Acid by CuCo2O4 Spinel Oxide Nanostructure Catalysts. ACS Catal. 10, 6741-6752 (2020).
Li, T., Cao, Y., He, J. & Berlinguette, C. P. Electrolytic CO2 Reduction in Tandem with Oxidative Organic Chemistry. ACS Cent Sci 3, 778-783 (2017).
Verma, S., Lu, S. & Kenis, P. J. A. Co-electrolysis of CO2 and glycerol as a pathway to carbon chemicals with improved technoeconomics due to low electricity consumption. Nature Energy 4, 466 (2019).
Xia, C. et al. Continuous production of pure liquid fuel solutions via electrocatalytic CO2 reduction using solid-electrolyte devices. Nature Energy 4, 776-785 (2019).
Fan, L., Xia, C., Zhu, P., Lu, Y. & Wang, H. Electrochemical CO2 reduction to high-concentration pure formic acid solutions in an all-solid-state reactor. Nat. Commun. 11, 3633 (2020).

(56) References Cited

OTHER PUBLICATIONS

Salvatore, D. A. et al. Electrolysis of Gaseous CO2 to CO in a Flow Cell with a Bipolar Membrane. ACS Energy Lett. 3, 149-154 (2018).

Yan, Z., Hitt, J. L., Zeng, Z., Hickner, M. A. & Mallouk, T. E. Improving the efficiency of CO2 electrolysis by using a bipolar membrane with a weak-acid cation exchange layer. Nat. Chem. 13, 33-40 (2020).

Lee, D.-Y., Elgowainy, A. & Dai, Q. Life cycle greenhouse gas emissions of hydrogen fuel production from chlor-alkali processes in the United States. Appl. Energy 217, 467-479 (2018).

Zhang, S. Prediction of selling price of hydrogen produced from methanol steam reforming. Energy Sources Part B: Econ. Plan. Policy 13, 28-32 (2018).

Kayfeci, M., Keçebaş, A. & Bayat, M. Hydrogen production. Solar Hydrogen Production 45-83 (2019) doi:10.1016/b978-0-12-814853-2.00003-5.

Shen, K.-Y., Park, S. & Kim, Y.-B. Hydrogen utilization enhancement of proton exchange membrane fuel cell with anode recirculation system through a purge strategy. Int. J. Hydrogen Energy 45, 16773-16786 (2020).

Woo, C. H. & Benziger, J. B. PEM fuel cell current regulation by fuel feed control. Chem. Eng. Sci. 62, 957-968 (2007).

Liu, M. et al. Improved Watergate Pulse Sequences for Solvent Suppression in NMR Spectroscopy. J. Magn. Reson. 132, 125-129 (1998).

Jhong, H.-R. 'molly', Ma, S. & Kenis, P. J. A. Electrochemical conversion of CO2 to useful chemicals: current status, remaining challenges, and future opportunities. Curr. Opin. Chem. Eng. 2, 191-199 (2013).

Orella, M. J., Brown, S. M., Leonard, M. E., Roman-Leshkov, Y. & Brushett, F. R. A General Technoeconomic Model for Evaluating Emerging Electrolytic Processes. Energy Technology 1900994 (2019).

Steward, D., Ramsden, T. & Zuboy, J. H2A Central Hydrogen Production Model, Version 3 User Guide (2012). National Renewable Energy Laboratory.

Rochelle, G. T. et al. CO2 Capture by Absorption with Potassium Carbonate Third Quarterly Report 2006. Austin, TX (2006).

Abu-Zahra, M. R. M., Niederer, J. P. M., Feron, P. H. M. & Versteeg, G. F. CO2 capture from power plants: Part II. A parametric study of the economical performance based on mono-ethanolamine. Int. J. Greenhouse Gas Control 1, 135-142 (2007).

Raksajati, A., Ho, M. T. & Wiley, D. E. Reducing the Cost of CO2 Capture from Flue Gases Using Aqueous Chemical Absorption. Ind. Eng. Chem. Res. 52, 16887-16901 (2013).

Ho, M. T., Allinson, G. W. & Wiley, D. E. Factors affecting the cost of capture for Australian lignite coal fired power plants. Energy Procedia 1, 763-770 (2009).

Haegel, N. M. et al. Terawatt-scale photovoltaics: Trajectories and challenges. Science 356, 141-143 (2017).

Soltani, R., Rosen, M. A. & Dincer, I. Assessment of CO2 capture options from various points in steam methane reforming for hydrogen production. Int. J. Hydrogen Energy 39, 20266-20275 (2014).

Dufek, E. J., Lister, T. E., Stone, S. G. & Mcllwain, M. E. Operation of a Pressurized System for Continuous Reduction of CO2. J. Electrochem. Soc. 159, F514 (2012).

Delacourt, C., Ridgway, P. L., Kerr, J. B. & Newman, J. Design of an electrochemical cell making syngas (CO+H2) from CO2 and H2O reduction at room temperature. Journal of the Electrochemical Society 155, B42 (2008).

Yin, Z. et al. An alkaline polymer electrolyte CO2 electrolyzer operated with pure water. Energy Environ. Sci. 12, 2455-2462 (2019).

Verma, S., Lu, X., Ma, S., Masel, R. I. & Kenis, P. J. A. The effect of electrolyte composition on the electroreduction of CO2 to CO on Ag based gas diffusion electrodes. Phys. Chem. Chem. Phys. 18, 7075-7084 (2016).

Li, F. et al. Cooperative CO2-to-ethanol conversion via enriched intermediates at molecule-metal catalyst interfaces. Nat. Catal. 3, 75-82 (2020).

Li, F. et al. Molecular tuning of CO2-to-ethylene conversion. Nature 577, 509-513 (2020).

\* cited by examiner (a)

(b)

(a)

(b)

METHODS AND APPARATUS FOR PERFORMING ELECTROLYTIC CONVERSION

CROSS-REFERENCE TO RELATED APPLICATIONS

This application claims benefit from U.S. Application No. 63/140,176 filed 21 Jan. 2021. For the purposes of the United States, this application claims the benefit under 35 U.S.C. § 119 of U.S. application No. 63/140,176 filed 21 Jan. 2021 and entitled METHODS AND APPARATUS FOR PERFORMING ELECTROLYTIC CONVERSION, which is hereby incorporated herein by reference for all purposes.

FIELD

This invention relates generally to apparatuses and methods for performing electrolytic conversion of bicarbonate in solution into useful products.

BACKGROUND

Carbon dioxide is the primary greenhouse gas emitted through human activities. Carbon capture is a way to reduce the emission of greenhouse gases Carbon capture technologies may capture carbon dioxide from the atmosphere or a point source. Captured carbon dioxide may be stored and/or converted to useful compounds. Such useful compounds may be used to form chemicals or fuels of economic value. Examples of such useful compounds are one-carbon (C1) compounds, two-carbon (C2) compounds and compounds with two or more carbons (C2+ compounds). Specific examples of such C1, C2, and C2+ compounds include carbon monoxide, formate, formic acid, ethylene and propanol.

The inventors have recognised a general need for improved methods and electrolyzers capable of reduction reactions at high efficiency and low operational costs.

SUMMARY

This invention has a number of aspects. These include, without limitation:
- methods and apparatuses for electrolyzing bicarbonate ($HCO_3^-$) solution into useful products at a desired voltage and current density without supplemental gaseous carbon dioxide;
- methods for electrolyzing bicarbonate ($HCO_3^-$) solution at a low applied potential (e.g., no more than 3 V) with high current density (e.g., 500 mA cm$^{-2}$) and a $CO_2$ utilization rate of over 40%; and
- methods for capturing atmospheric carbon dioxide.

One aspect of the invention provides a method for performing a carbon dioxide reduction reaction in an electrolyzer. The method involves the direct reduction of bicarbonate at the cathode with an oxidation reaction at the anode. The oxidation reaction may provide a source of protons ($H^+$) to the cathode for the reduction reaction.

In some embodiments, the oxidation reaction is a hydrogen oxidation reaction (HOR). In such embodiments, the method involves supplying hydrogen gas to the anode to participate in the oxidation reaction to produce protons ($H^+$). The protons ($H^+$) may be transported through an ion exchange membrane to the cathode. The method also involves supplying an aqueous solution comprising bicarbonate ions ($HCO_3^-$) to the cathode. The protons ($H^+$) produced at the anode may react with the bicarbonate ions at the cathode to yield one or more products.

In some embodiments, the aqueous solution comprising the bicarbonate ions ($HCO_3^-$) is substantially free of gaseous carbon dioxide ($CO_2$).

Aspects of the invention relate to methods of electrolyzing bicarbonate solution ($HCO_3^-$) at a low applied potential with high current density. In some embodiments, the electrical potential applied between the cathode and the anode does not exceed 5V. In some embodiments, the electrical potential applied between the cathode and the anode does not exceed 2.5 V. In some embodiments, the current density is maintained at 100 mA/cm$^{-2}$ or greater. In some embodiments, the current density is maintained at 500 mA/cm$^{-2}$ or greater.

Some embodiments of the method involve increasing the pressure of the aqueous solution comprising bicarbonate ions. The pressure of the aqueous solution may be maintained within a range of from about 1.1 atm to about 40 atm. In some embodiments, the pressure of the aqueous solution is maintained within a range of from about 1.1 atm to about 10 atm.

The one or more products produced from the electrolytic conversion of bicarbonate solution may be a liquid product and/or a gaseous product. The one or more products may comprise a carbon-containing compound. The carbon-containing compound may be C1, C2, and C2+ compounds. Examples of carbon-containing compounds that may be produced include carbon dioxide, formate, carbon monoxide, formic acid, ethylene and/or propanol.

In some embodiments, the one or more products comprise no more than 50% carbon dioxide ($CO_2$). In some embodiments, the one or more products comprise no more than 30% carbon dioxide ($CO_2$).

Operating conditions that may be favourable in the electrolysis of bicarbonate solution using methods of this invention include for example:
- the pH of the bicarbonate solution maintained at about 4 or greater;
- the concentration of bicarbonate solution fed to the cathode in the range of from about 0.1 M to about 3.3 M;
- the temperature maintained in the range of from about 60° C. to about 80° C.; and/or
- the pressure maintained at the cathode and/or anode in the range of from about 1 atm to about 40 atm.

In some embodiments, the one or more products formed at the cathode comprise hydrogen gas ($H_2$). The hydrogen gas ($H_2$) formed at the cathode may be delivered to the anode to participate in the oxidation reaction to form protons ($H^+$).

In some embodiments, excess protons ($H^+$) are discharged from the anode. The excess protons (H+) may be recycled to the anode to participate in the oxidation reaction to form protons ($H^+$).

Aspects of the invention relate to a system for performing a carbon dioxide reduction reaction. The system comprises an electrolyzer. The electrolyzer comprises an anode exposed in an anode chamber, a cathode exposed in a cathode chamber, and an ion exchange membrane separating the anode and the cathode. The anode may be adapted to oxidize hydrogen gas to form hydrogen ions. The cathode may be adapted to react hydrogen ions formed from the anode with bicarbonate ions contained in an aqueous solution. The ion exchange membrane may be adapted to allow the hydrogen ions formed from the anode to diffuse therethrough to enter the cathode chamber to react with the bicarbonate ions to yield one or more products.

In some embodiments, the aqueous solution is substantially free of gaseous carbon dioxide ($CO_2$).

The electrolyzer further comprises a power supply. In some embodiments, the power supply is configured to drive the electrolyzer with a potential difference that does not exceed 5 V. In some embodiments, the power supply is configured to drive the electrolyzer with a potential difference that does not exceed 2.5 V. In some embodiments, the potential difference introduces a current density of at least 100 mA/cm$^{-2}$. In some embodiments, the potential difference introduces a current density of at least 500 mA/cm$^2$.

In some embodiments, the electrolyzer includes a buffer layer. The buffer layer may be arranged between the ion exchange membrane and the cathode to allow the transport of protons ($H^+$) therethrough after the protons ($H^+$) diffuse through the ion exchange membrane.

In some embodiments, the cathode may be made of a metallic foam. In one example embodiment, the cathode is made of a free-standing silver foam.

In some embodiments, the cathode and/or anode comprises a gas diffusion electrode.

In some embodiments, the anode and the cathode are arranged to press against opposing faces of the ion exchange membrane.

Some embodiments involve combining a carbon capture system with the electrolyzer. The carbon capture system may comprise a contactor. The contactor may be configured to bring a gas comprising carbon dioxide into contact with a capturing solution to form the aqueous solution comprising bicarbonate ions. The contactor may comprise a fluid outlet. The fluid outlet of the contactor may be in fluid communication with a fluid inlet of the cathode chamber for delivering the aqueous solution to the cathode.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Figure 1:
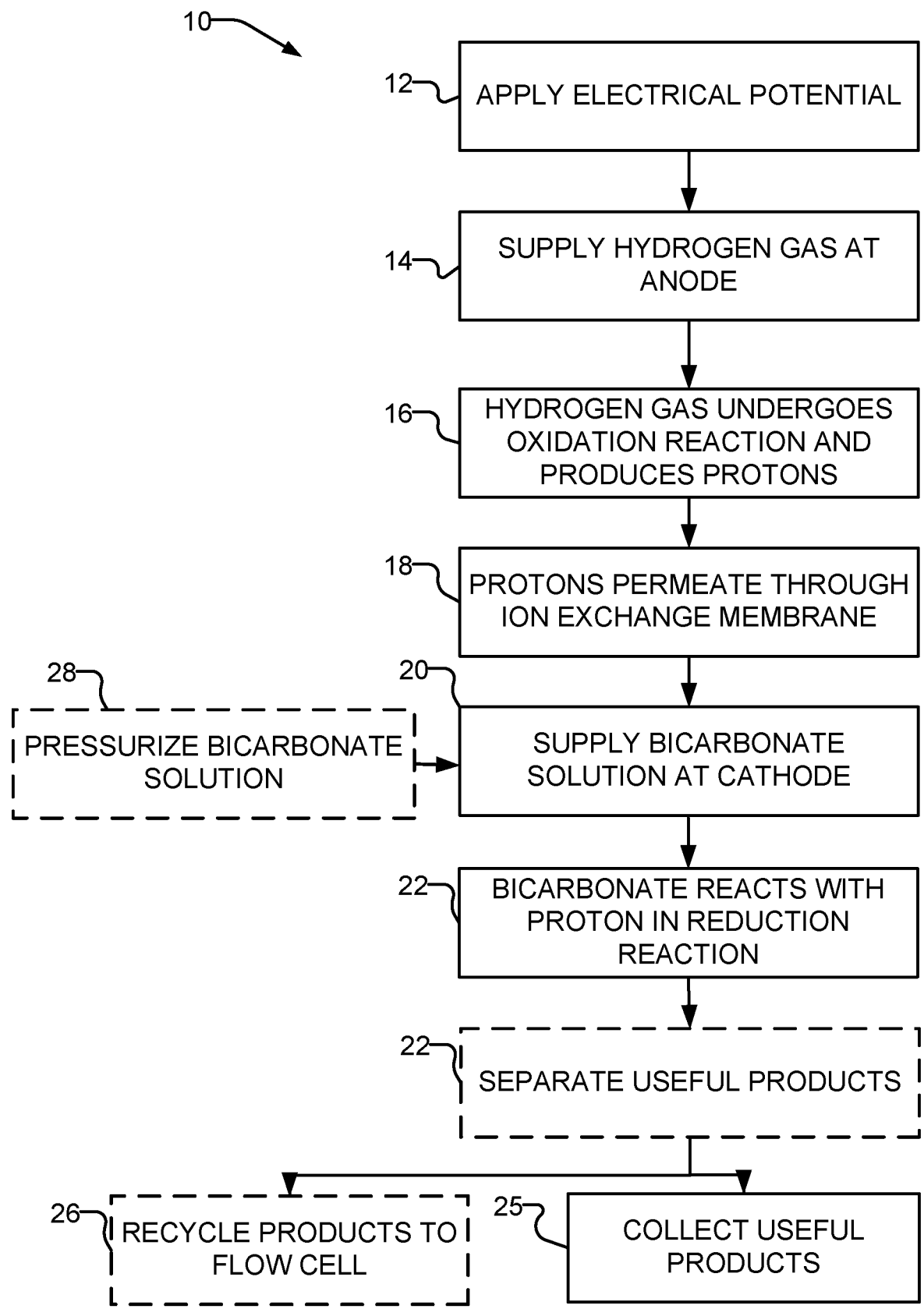
FIG. 1 is a flow chart showing the steps in a method for electrolyzing bicarbonate according to an example embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Definitions

"Bipolar membrane" or "BPM" is a membrane comprising plural layers including an anion exchange layer on one side and a cation exchange layer on another side. A bipolar membrane may comprise one or more layers between the anion exchange layer and the cation exchange layer. For example, an intermediate layer may comprise a catalyst which facilitates dissociation of water into protons and hydroxide ions. The anion exchange layer may conduct hydroxide ions. The cation exchange layer may conduct protons. An example bipolar membrane is Fumasep FBM™ available from FUMATECH BWT GmbH.

"Cation exchange membrane" or "CEM" is a membrane that is selectively permeable to cations. One example of such cations is protons (H$^+$). Protons move from the anode to the cathode through a cation exchange membrane. An example cation exchange membrane is Nafion™.

"Membrane electrode assembly" or "MEA" is an assembly comprising an anode and a cathode separated by an ion exchange membrane. The anode and the cathode may respectively comprise catalysts suitable for promoting oxidation reactions at the anode and reduction reactions at the cathode.

"Flow cell" refers to an electrochemical cell in which a catholyte and/or anolyte are flowed through the cell while the cell is in operation. A non-limiting example construction of a flow cell provides flow plates separated by an MEA. An anode flow plate is located at the anode side of the MEA and a cathode flow plate is located at the cathode side of the MEA. The anode and cathode flow plates comprise flow channels that respectively receive an anode feed and a cathode feed. A power supply is connected across the anode and cathode of the MEA in the flow cell to drive oxidation reactions at the anode and reduction reactions at the cathode.

"Current density" is total current divided by the geometric surface area of an electrode. For example, an electrode having an area of 100 cm$^2$ carrying an electrical current of 20 Amperes would have a current density of 200 mA/cm$^2$.

"Faradaic efficiency" (F.E.) is a measure of the efficiency with which an electron transfer reaction generates a desired product. Faradaic efficiency can be reduced by side reactions which create undesired products or by further reactions which consume the desired product after it is produced. F.E. for a gaseous product k may be determined in accordance with Equation 1.

$$FE = \frac{n_k F x_k F_m}{I} \quad \text{(Eq. 1)}$$

where $n_k$ is the number of electrons exchanged, F is Faraday's constant (F=96,485 C/mol), $x_k$ is the mole fraction of the gas k in the gaseous mixture analyzed, $F_m$ is the molar flow rate in mol/s, and I is the total current in A. The molar flow rate may be derived from the volume flow rate $F_v$ by the relation $F_m$=p$F_v$/RT, with p being the atmospheric pressure in Pa, R the ideal gas constant of 8.314 J/mol K and T the temperature in Kelvin.

"Oxygen evolution reaction" or "OER" is the process of generating molecular oxygen by an electrochemical reaction. An example of an oxygen evolution reaction is the oxidation of hydroxide, in accordance with Equation 2.

$$4OH^-_{(aq)} - 4e^- \rightarrow 2H_2O_{(l)} + O_{2(g)} \quad \text{(Eq. 2)}$$

"Hydrogen oxidation reaction" or "HOR" is an electrochemical reaction that involves the oxidation of hydrogen molecules. The reaction products depend on the environment in which the reaction occurs. The environment may be acidic or alkaline.

"Substantially free of gaseous CO$_2$" when applied to a catholyte comprising bicarbonate ions means that if the catholyte carries any gaseous CO$_2$, the molar ratio of gaseous CO$_2$ carried by the catholyte to bicarbonate (HCO$_3^-$) ions in the catholyte is not more than about 2% per minute at which the catholyte is delivered into the electrochemical cell. "Substantially free of gaseous CO$_2$" when applied to a feed to a cathode chamber that encloses a cathode at which bicarbonate ions undergo an electrochemical reaction means that if the feed includes any gaseous CO$_2$, the molar ratio of gaseous CO$_2$ introduced to the cathode chamber with the feed to the bicarbonate (HCO$_3^-$) ions that react at the cathode is not more than about 2% per minute at which the feed is supplied to the cathode chamber.

Example Embodiments

Aspects of the invention relate to a particularly efficient method of electrolyzing bicarbonate which involves coupling a reduction reaction at the cathode of an electrochemical cell which reduces bicarbonate with an oxidation reaction at an anode of the electrochemical cell which generates protons. The oxidation reaction provides a source of protons (H$^+$) for the reduction of bicarbonate. In example embodiments, the electrochemical method involves coupling a hydrogen oxidation reaction (HOR) at the anode with the direct reduction of bicarbonate solution at the cathode. The coupling of HOR with the direct reduction of bicarbonate solution can provide highly efficient conversion of bicarbonates to useful chemical products.

The bicarbonate solution may be obtained from a carbon capture process.

The basic approach of a carbon capture process is to use chemical reactions to capture $CO_2$ from the atmosphere. A capturing solution may be used to react with a gas containing carbon dioxide such as an atmospheric gaseous source, flue gas, exhaust gas, or the like to capture $CO_2$ from the gas. In some carbon acapture technologies the gas is contacted with the capturing solution in a gas-liquid contacter. A suitable capturing solution may for example be a strong base (e.g., solution of KOH or NaOH) or an amine-based solvent. The product of the carbon capture process may be supplied to an electrochemical cell to yield useful chemical products.

In embodiments of this invention, a solvated product of the carbon capture process (e.g. bicarbonate ions) is directly supplied to the electrochemical cell for reduction.

Particular applications of such electrochemical methods relate to the efficient conversion of bicarbonate obtained by carbon capture into useful chemical products such as C1 (one-carbon molecule), C2 (two-carbon molecules) and C2+ (two or more carbon) products. Non-limiting examples of C1, C2 and C2+ compounds include carbon monoxide, formate, formic acid, ethylene and propanol.

In example embodiments involving the direct electrolysis of bicarbonate solution to carbon monoxide by coupling the reduction and oxidation reactions, the electrolysis is operated at a current density of at least about 500 mA cm$^{-2}$ with an applied electrical potential of about 2.3 V. A current density of 500 mA cm$^{-2}$ may be calculated as a partial current density at the cathode of about 220 mA cm$^{-2}$. In these example embodiments in which an electrical potential of about 2.3 V is applied, the amount of $CO_2$ utilized in the reduction reaction (i.e., the $CO_2$ utilization rate) of at least 40% can be achieved.

In example embodiments in which the electrolysis is operated at a current density of 100 mA cm$^{-2}$, a faradaic efficiency of at least about 40% can be achieved. A faradaic efficiency of at least about 89% at a current density of about 100 mA cm$^{-2}$ can be achieved in example embodiments in which a pressurized bicarbonate solution is supplied to the cathode.

FIG. 1 is a flow chart illustrating the steps of an example electrochemical method 10. In block 12, an electrical current and/or potential is applied between an anode and a cathode. In block 14, hydrogen gas (H2) is supplied at the anode. In block 16, the hydrogen gas (H2) undergoes an oxidation reaction to produce protons (H+). The protons (H+) permeate through an ion exchange membrane toward the cathode (block 18). In block 20, a bicarbonate ($HCO_3^-$) solution is supplied at the cathode. The bicarbonate undergoes a reduction reaction by reacting with the protons (H+) produced by the oxidation reaction to form one or more useful chemical products (block 22). The oxidation reaction at block 16 is performed simultaneously with the reduction reaction at block 22.

The one or more useful chemical products is optionally separated (block 24). The one or more products may be separated by for example using a selective membrane or other technologies. Some or all of the products may be collected and/or stored (block 25). One or more other products may be recycled back to the anode and/or cathode (block 26). The one or more other products may be used as reactants in one or both of the reduction and oxidation reactions.

In some embodiments, the one or more useful products comprise a liquid product. In some embodiments, the one or more useful products comprise a gaseous product. The one or more useful products may comprise hydrogen gas. The hydrogen gas (H$_2$) may be recycled back to the anode as a reactant to participate in the oxidation reaction. The one or more useful products may comprise a carbon-containing compound. The carbon-containing compound may be a C1, C2, or C2+ compound. In some embodiments, the carbon containing compound comprises one or more of carbon monoxide, formate, formic acid, ethylene and propanol.

In example embodiments, the useful products comprise $CO_2$, CO and H$_2$. In example embodiments, the useful products comprise no more than 50% $CO_2$. In example embodiments, the useful products comprise no more than 30% $CO_2$.

In some embodiments, a gas is supplied to the bicarbonate solution ($HCO_3^-$) to form a pressurized bicarbonate solution (block 28) prior to the supplying the solution to the cathode at block 20. For example, a suitable gas may be introduced to a catholyte reservoir carrying the bicarbonate solution ($HCO_3^-$). A non-limiting example of a suitable gas is nitrogen gas (N$_2$), argon gas (Ar) and the like In example embodiments, the pressure of the bicarbonate solution is maintained within the range of from about 1.1 atm to about 40 atm. In some embodiments, the pressure of the bicarbonate solution is maintained within the range of from about 1.1 atm to about 20 atm.

Supplying a pressurized bicarbonate solution ($HCO_3^-$) at the cathode has the advantage of increasing the solubility of $CO_2$ in the catholyte. This may result in decreasing the amount of i-CO2 being converted into gas bubbles which may escape the electrolyte. "i-CO$_2$" refers to the in-situ $CO_2$ that is formed from the reduction reaction between protons (H$^+$) and bicarbonate solution ($HCO_3^-$)). A greater amount of $CO_2$ may thus be present to participate in further reduction reactions to form desired products such as CO. Supplying a pressurized ($HCO_3^-$) at the cathode facilitates an increase in faradaic efficiency for the desired product(s) and/or the rate of electrochemical reduction reaction. The electrochemical reduction of a pressurized bicarbonate solution ($HCO_3^-$) advantageously improves product selectivity.

Electrochemical method 10 may be tuned to optimize one or more of product selectivity, current efficiency and reaction rate of each of the electrolysis reaction by adjusting one or more of:
 conditions of the flow cell such as temperature, pH, pressure, etc.; and/or
 flow rate and/or composition of the reactants and/or catholyte and/or anolyte; and/or
 characteristics of the ion exchange membrane such as the thickness, porosity, etc.; and/or
 electrical operating conditions such as the applied electrical potential; and/or
 characteristics of the cathode and/or anode electrodes such as the material and method of fabrication; and/or
 nature of the cathode and/or anode catalyst;
 etc.

The products of electrochemical method 10 may be selectively targeted. This may for example be done by selecting a cathode catalyst that favors the production of the desired product(s). In one example, a silver cathode catalyst may be selected to favor the production of $CO_2$/CO. In another example, a bismuth cathode catalyst may be selected to favour the formation of formate while suppressing the formation of CO. In a further example, C2+ compounds are desired. Different methods that may be used to selectively promote the production of C2+ compounds include for example selecting a copper cathode catalyst and/or modifying a catalyst surface and/or creating a basic (or high pH) local environment near the cathode, etc.

Adjusting the pressure of the bicarbonate solution ($HCO_3^-$) being fed at the cathode and the cathode catalyst alone or in combination may achieve the desired product selectivity and/or current efficiency of the reaction.

Aspects of the methods and apparatuses of this invention relate to electrolyzing bicarbonate to yield useful products at low applied electrical potentials while achieving high current densities.

In some embodiments, the electrolysis is operated at an electrical potential difference applied between the cathode and the anode of less than 5V. In some embodiments, the electrolysis is operated at an electrical potential difference applied across the cathode and the anode is less than 3V. In some embodiments, the electrolysis is operated at an electrical potential difference applied between the cathode and the anode of about 1V to about 5V including any value therebetween such as 4.5 V, 4V, 3.5 V, 3 V, 2.5 V, 2 V, 1.5 V, 1V, 0.5V, etc.

In some embodiments, an electrical potential difference applied between the anode and the cathode introduces a current density of about 50 mA $cm^{-2}$ to about 1000 mA $cm^{-2}$, including any value therebetween such as 100 mA $cm^{-2}$, 150 mA $cm^{-2}$, 200 mA $cm^{-2}$, 250 mA $cm^{-2}$, 300 mA $cm^{-2}$, 350 mA $cm^2$, 400 mA $cm^{-2}$, 450 mA $cm^{-2}$, 500 mA $cm^{-2}$, 550 mA $cm^{-2}$, 600 mA $cm^{-2}$, 650 mA $cm^{-2}$, 700 mA $cm^{-2}$, 750 mA $cm^{-2}$, 800 mA $cm^{-2}$, 850 mA $cm^{-2}$, 900 mA $cm^{-2}$, 950 mA $cm^{-2}$, etc. In some embodiments, the current density is maintained at a level of at least 100 mA $cm^{-2}$. In some embodiments, the current density is maintained at a level of at least 500 mA $cm^{-2}$. In some embodiments, the partial current density at the cathode is maintained at a level of at least 200 mA $cm^{-2}$.

In an example embodiment, the electrolysis is operated at a current density of about 500 mA $cm^{-2}$ with an electrical potential difference applied between the anode and the cathode of about 2.3 V. In another example embodiment, the electrolysis is operated at a current density of about 100 mA $cm^{-2}$ with an electrical potential difference applied between the anode and the cathode of about 1.7 V. A current density of 500 mA $cm^{-2}$ may be calculated as a partial current density at the cathode of about 220 mA $cm^{-2}$. In these example embodiments, the amount of $CO_2$ utilized in the reduction reaction (i.e., the $CO_2$ utilization rate) of between about 20% to about 40% can be achieved. In an example embodiment, the $CO_2$ utilization rate is at least about 40%.

Aspects of the methods and apparatus of this invention relate to converting bicarbonate to useful products at high faradaic efficiencies. High faradaic efficiencies may be achieved with low current densities. In example embodiments, the faradaic efficiency of greater than about 70% may be achieved with an applied current density of about 100 mA $cm^{-2}$. In example embodiments, the faradaic efficiency of greater than about 40% may be achieved with an applied current density of about 500 mA $cm^{-2}$. In some embodiments, the electrical potential applied across the anode and the cathode introduces a current density about 50 mA $cm^{-2}$ to about 1000 mA $cm^{-2}$.

Figure 2:
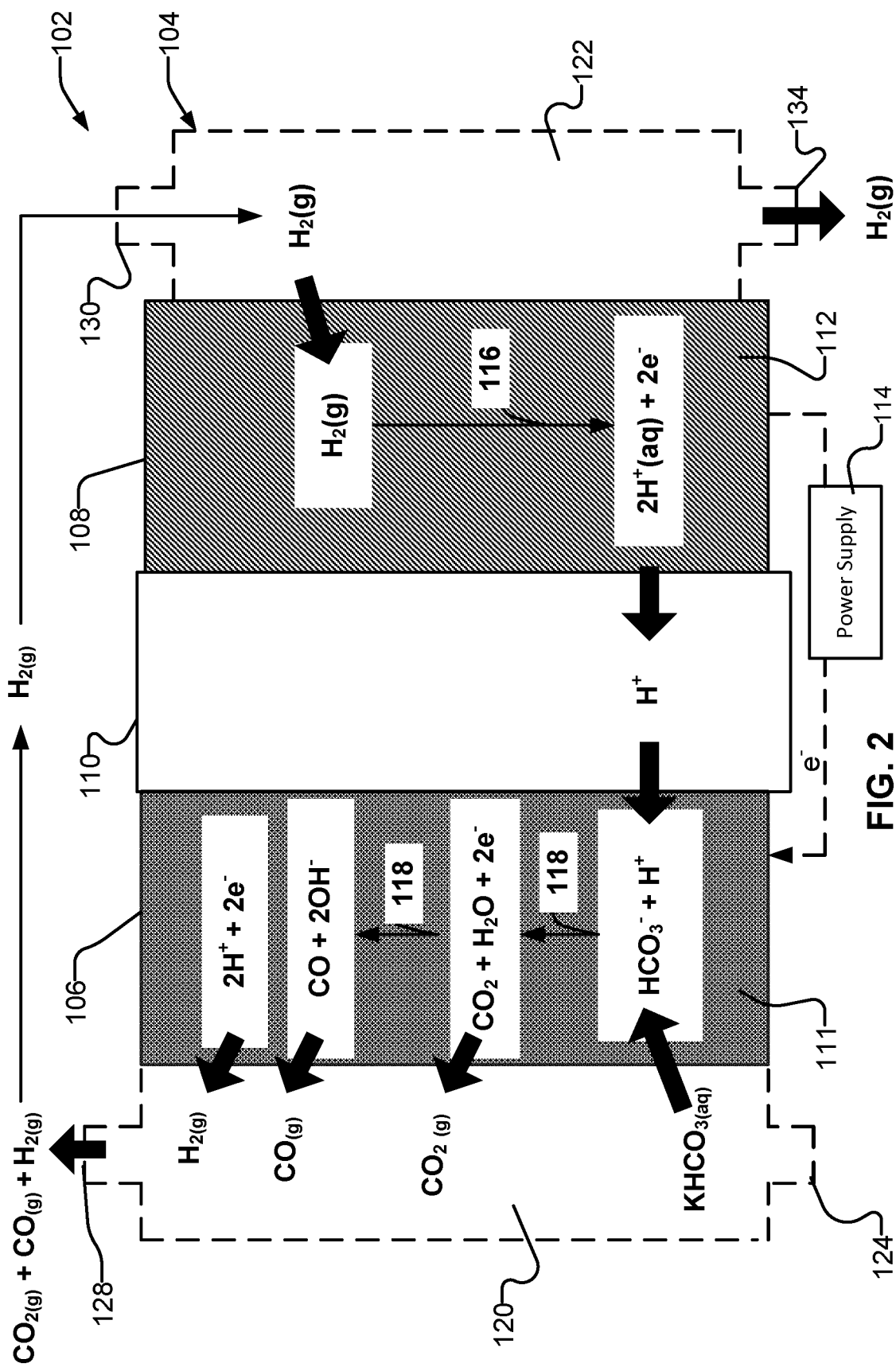
FIG. 2 is a schematic diagram of an electrochemical cell operating the FIG. 1 method according to an example embodiment of this invention.

FIG. 2 illustrates an example electrochemical cell of a type that may be used to perform electrochemical method 10. FIG. 2 depicts some of the electrochemical reactions that are believed to occur in an electrochemical flow cell according to an example electrochemical method 10. The example method shows the reactions that are believed to occur in the conversion of bicarbonate to carbon monoxide. This is only an example. The electrolysis of bicarbonate using electrochemical method 10 may produce other useful chemical products. Different chemical reactions will occur in the production of the other useful chemical products.

Electrochemical reactor 100 comprises at least one electrochemical flow cell 102. Flow cell 102 comprises a cathode 106 and an anode 108. An ion exchange membrane 110 separates cathode 106 and anode 108. Cathode 106 is exposed to a cathode chamber 111. Anode 108 is exposed to an anode chamber 112.

In some embodiments, ion exchange membrane 110 is pressed against one or both of cathode 106 and anode 108. In some embodiments, cathode 106 and anode 108 are compressed on opposing sides of ion exchange membrane 110. In such electrochemical cell designs, the inter-electrode gap between the electrodes is equal to the thickness of ion exchange membrane 110. Such a design is known as a "zero-gap" electrolyzer. Embodiments of this invention are not limited to a zero-gap electrolyzer. Another example cell construction provides an electrochemical cell comprising an anode, a cathode and a membrane separating the anode and the cathode. The anode and the cathode in this example cell are arranged spaced-apart from the membrane.

A power source 114 is connected to apply a potential difference between cathode 106 and anode 108. A negative electrical charge is applied to the cathode. A positive electrical charge is applied to the anode. An oxidation reaction 116 takes place at anode 108. A reduction reaction 118 takes place at cathode 106. Power source 114 may be configured to maintain a desired electric current between cathode 106 and anode 108 and/or to maintain a potential difference between cathode 106 and anode 108 at a desired level or in a desired range.

Cathode 106 may comprise any materials suitable for use as an electrode. Such material may comprise a catalyst suitable for promoting the electrochemical production of desired products when bicarbonate solution is supplied to flow cell 102.

Anode 108 may comprise any materials suitable for use as an electrode. Such material may comprise a catalyst suitable for driving a hydrogen oxidation reaction (HOR).

Cathode 106 and/or anode 108 may comprise a gas diffusion electrode (GDE). In some embodiments, cathode 106 and/or anode 108 is made of one or more metal, alloy or a supported metal/alloy catalyst. The metal may be any transition metal, or combination of one or more transition metals. Cathode 106 and/or anode 108 may be porous. An example of a porous electrode may be a foam. The foam may for example be made of a metallic material. In an example embodiment, anode 108 comprises platinum supported on carbon black. In an example embodiment, cathode 106 comprises a free-standing layer of porous silver (Ag) foam.

Ion exchange membrane 110 may be arranged to allow the transport of protons (H+) produced from oxidation reaction 116 at anode 108 to cathode 106. In some embodiments, ion exchange membrane 110 is a cation exchange membrane. The cation exchange membrane is in some example embodiments commercially available under the product name Nafion™.

In some embodiments, the thickness of ion exchange membrane 110 is in the range of from 10 μm to 300 μm. The thickness of ion exchange membrane 110 may for example be chosen based on the expected pressure differential across ion exchange membrane 110 during operation of electrochemical cell. n an example embodiment, the thickness of ion exchange membrane 110 is about 25 μm when the operating pressure at cathode 106 is at an ambient atmospheric pressure (for example at about 1 atm). In another example embodiment, the thickness of ion exchange membrane 110 is about 50 μm when the operating pressure at cathode 106 is at about 3.5 atm.

In some embodiments, a buffer layer may be arranged to separate ion exchange membrane 110 from cathode 106. The buffer layer may comprise microfluidic channels. The microfluidic channels allow the transport of protons (H+) through the buffer layer. In such embodiments, protons (H+) that are produced at anode 108 permeate through both ion exchange membrane 110 and the buffer layer before flowing into cathode chamber 111. Including a buffer layer may facilitate the selective formation of desired products. This may be done by suppressing the transport of protons (H+) to cathode 106. In one example embodiment, the buffer layer has a thickness of about 500 μm. The thickness of the buffer layer may however be adjusted based on the operating conditions of electrochemical cell 100. In some embodiments, cathode 106 and ion exchange membrane 110 are compressed on opposing sides of the buffer layer. In other embodiments, cathode 106 and ion exchange membrane 110 are arranged spaced-apart from the buffer layer.

A bicarbonate solution ($HCO_3^-$) is supplied to cathode 106 as a catholyte. The bicarbonate solution ($HCO_3^-$) is in some embodiments supplied in the absence of a gaseous $CO_2$ feed. In some embodiments, cathode 106 is supplied with bicarbonate solution ($HCO_3^-$) that is substantially free of gaseous $CO_2$. In some embodiments, the amount of $CO_2$ gas carried by the catholyte containing bicarbonate ions ($HCO_3^-$) is less than about 5 sccm per $cm^2$ of the surface area of the cathode. A suitable anolyte may be supplied to anode 108. A suitable anolyte facilitates the oxidation reaction at anode 108 by providing electrons to $H_2$ to yield protons ($H^+$). A suitable anolyte may be an acid. Non-limiting examples of suitable anolytes include $H_2SO_4$, HCl, $H_3PO_4$.

Hydrogen gas ($H_2$) is supplied to anode 108. $H_2$ undergoes oxidation reaction 116 at anode 108. In example embodiments, oxidation reaction 116 is a hydrogen oxidation reaction (HOR). HOR at anode 108 yields protons (H+). The HOR may occur in accordance with Equation 3 below.

$$H_{2(g)} \rightarrow 2H^+_{(g)} + 2e^- \tag{Eq. 3}$$

The protons (H+) may permeate through ion exchange membrane 110 toward cathode 106 to participate in reduction reaction 118. The protons participate in reduction reaction 118 by reacting with bicarbonate ions ($HCO_3^-$) at cathode 106 to form one or more useful compounds. The one or more useful compounds may for example include carbon dioxide $CO_2$, CO and $H_2$. This acid/base equilibrium reaction between $HCO_3^-$ and H+ at or near the electrocatalyst surface of cathode 106 may occur in accordance with Equation 4 below.

$$H^+_{(aq)} + HCO_3^-{}_{(aq)} \rightleftharpoons CO_{2(g)} + H_2O_{(l)} \tag{Eq. 4}$$

In some embodiments, at least some of the resulting $CO_2$ undergoes catalyzed electrochemical reactions at cathode 106 to yield CO. These $CO_2$ reduction reactions may occur in accordance with Equations 5-7 below.

$$2HCO_3^- + CO_2 + 2e^- \rightarrow CO + 2CO_3^{2-} + H_2O \tag{Eq. 5}$$

$$2H^+ + CO_2 + 2e^- \rightarrow CO + H_2O \tag{Eq. 6}$$

$$H_2O + CO_2 + 2e^- \rightarrow CO + 2OH^- \tag{Eq. 7}$$

Protons and/or water may be reduced at cathode 106 in accordance with Equations 8 and 9 to yield $H_2$.

$$2H_2O + 2e^- \rightarrow H_2 + 2OH^- \tag{Eq. 8}$$

$$2H^+ + 2e^- \rightarrow H_2 \tag{Eq. 9}$$

The $H_2$ produced at cathode 106 may be recycled to anode 108 for reuse in oxidation reaction 116. $H_2$ produced at cathode 106 may be separated from the other products (e.g., CO) before recycling back to anode 108. In some embodiments, unreacted or excess $H_2$ that flows out of cell 100 is recycled back to anode 108 for reuse.

In some embodiments, the concentration of bicarbonate solution being supplied to cathode 106 for reaction with protons (H+) is in the range of about 0.1 to about 6 M. In some embodiments, the concentration of bicarbonate solution is in the range of from about 0.1 M to about 3.3 M.

In some embodiments, the electrolysis is operated at a temperature in the range of from 0 to about 80° C. In some embodiments, the electrolysis is operated at a temperature in the range of from about 60° C. to about 80° C.

In some embodiments, hydrogen gas ($H_2$) is heated to a temperature before being supplied to anode 108. In some embodiments, hydrogen gas ($H_2$) is heated to a temperature in the range of from about 40° C. to about 80° C. In some embodiments, hydrogen gas ($H_2$) is heated to a temperature of about 60° C.

In some embodiments, the electrolysis is operated at an operating pressure at cathode 106 and/or anode 108 in the range of from about 1 atm to about 40 atm. In some embodiments, the operating pressure at cathode 106 and/or anode 108 is in the range of from about 4 atm to about 40 atm. In some embodiments, the operating pressure at cathode 106 and/or anode 108 is in the range of from about 10 atm to about 40 atm.

The flow rates at which bicarbonate solution and hydrogen gas ($H_2$) are delivered to cathode 106 and anode 108 may be scaled according to the area of the electrode. In some embodiments, the flow rate at which bicarbonate solution is delivered to cathode 106 is in the range of from about 70 mL $min^{-1}$ to about 100 mL $min^{-1}$ for a cathode having a geometric surface area of 4 $cm^2$. In some embodiments, the flow rate at which hydrogen gas ($H_2$) is delivered to anode 108 is in the range of from about 1 sccm $cm^{-2}$ (anode) to about 100 sccm $cm^{-2}$ (anode).

Figure 3:
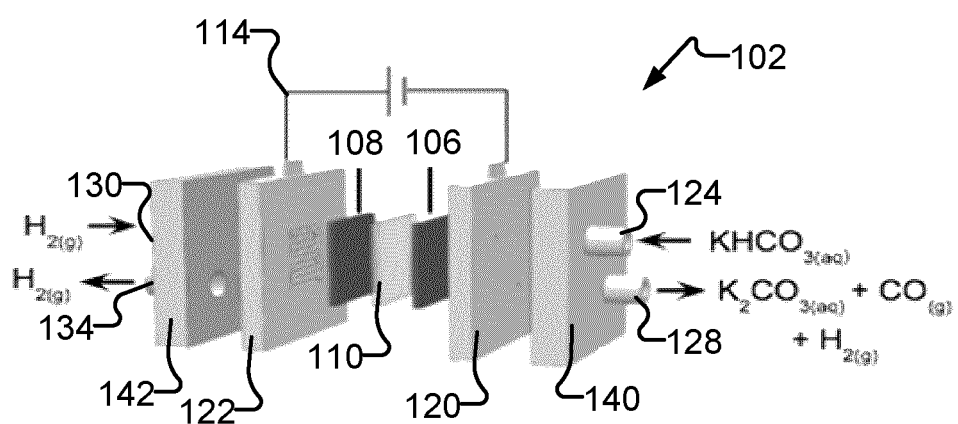
FIG. 3 is a schematic diagram showing an electrolyzer according to an example embodiment of the invention.
Figure 4:
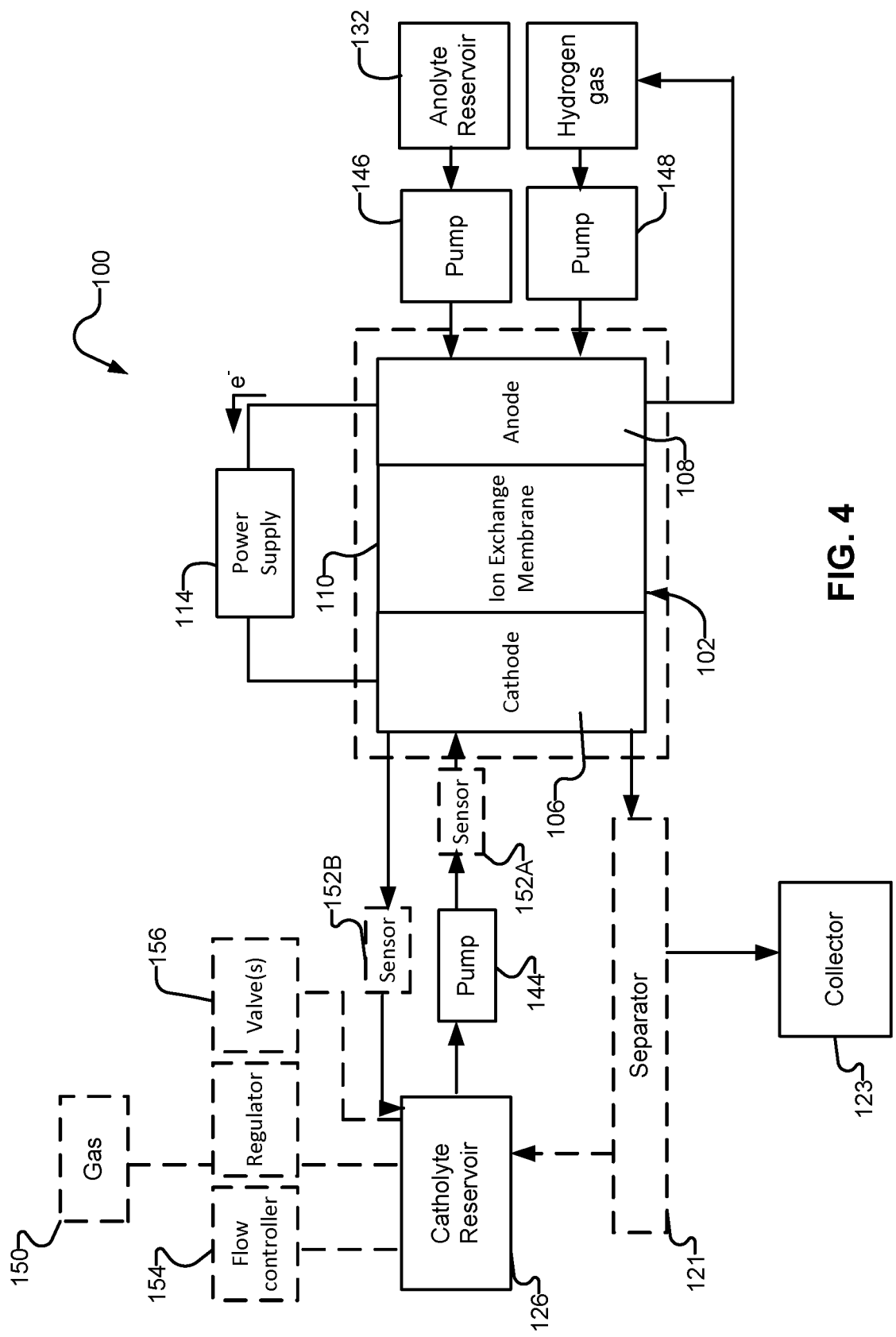
FIG. 4 is a block diagram illustrating the FIG. 2 electrochemical cell including ancillary equipment according to an example embodiment of the invention.

FIG. 3 is a schematic diagram showing a flow electrolyzer according to an example embodiment. FIG. 4 is a block diagram illustrating a cation exchange membrane-based electrochemical reactor including ancillary equipment according to an example embodiment.

Referring to FIGS. 3 and 4, in some embodiments, electrochemical cell 100 comprises a flow cell 102. In such embodiments, a cathode flow plate 120 is pressed against cathode 106. An anode flow plate 122 may be pressed against anode 108. An inlet 124 of cathode flow plate 120 may be fluidly connected to a catholyte reservoir 126. Catholyte reservoir 126 contains bicarbonate solution. Bicarbonate solution may be delivered to cathode 106 by flowing through the inlet 124 of cathode flow plate 120. An outlet 128 of cathode flow plate 120 may also be fluidly connected to a collector (not shown). Useful products may flow out of cell through outlet 128 of cathode flow plate 120. Useful products may be separated from one another in a separator 121. Some of the separated products may be stored in a collector 123. Some of the separated products may be recycled back to flow cell 102.

An inlet 130 of anode flow plate 122 may be fluidly connected to an anolyte reservoir 132. Anolyte reservoir 132 contains any suitable anolyte such as an acidic anolyte. Inlet 130 of anode flow plate 122 may also be fluidly connected to a gas tank comprising hydrogen gas ($H_2$) (not shown). $H_2$ and anolyte may be delivered to anode 108 by flowing through the inlet 130 of anode flow plate 122. An outlet 134 of anode flow plate 122 may be fluidly connected to an electrolyte drain (not shown). Unreacted $H_2$ may flow out of cell 100 through outlet 134 of anode flow plate 122.

Housings 140, 142 may be arranged to press against cathode and anode flow plates 120, 122 respectively.

A catholyte pump 144 may be arranged to deliver the bicarbonate solution to cathode 106. Catholyte pump 144 may deliver bicarbonate solution through cathode flow plate 120. An anolyte pump 146 may be arranged to deliver anolyte to anode 108. A reactant pump 148 may be arranged to deliver H2 to anode 108. Anolyte pump 146 may deliver anolyte through anode flow plate 122. Reactant pump 148 may be arranged to deliver H2 through anode flow plate 122.

One or more flow meters (not shown) may be provided to monitor the flow rates at which bicarbonate solution, hydrogen gas and/or anolyte are delivered to cathode 106 and anode 108. Pumps 144, 146, 148 may be communicatively connected to the flow meter(s) to maintain a desired flow rate at which bicarbonate solution, hydrogen gas and/or anolyte are delivered to the electrodes.

In some embodiments, a source of gas 150 is delivered to catholyte reservoir 126 to increase the pressure of the bicarbonate solution. Other suitable methods and technologies of increasing the pressure of the bicarbonate solution may alternatively be used.

In some embodiments, one or more pressure sensors 152A, 152B are provided to measure the pressure of the bicarbonate solution being supplied to cathode 106 and being returned to catholyte reservoir 126 respectively. A mass flow controller 154 may be provided to monitor the flow rates at which the source of gas is supplied to catholyte reservoir 126. One or more pressure valves 156 may be provided to control the amount of gas is supplied to catholyte reservoir 126. Pressure sensors 152A, 152B, mass flow controller 154 and/or pressure valves 156 may be communicatively connected.

An aqueous solution comprising carbonate ions ($CO_2^-$) may in some embodiments be supplied to cathode 106. In one example embodiment, catholyte reservoir 126 contains an alkali metal carbonate such as potassium carbonate ($K_2CO_3$).

Aspects of the invention relate to combining methods and apparatuses of electrolytic conversion of bicarbonate with upstream processes and apparatuses for preparing one or more reactants for the electrolysis.

In some embodiments, electrochemical method 10 is combined with an upstream carbon capture process. In one example carbon capture process, $CO_2$ is absorbed from a gaseous source (e.g., air, flue gas, exhaust gas) by reacting the gaseous source with a liquid sorbent to yield bicarbonate ($HCO_3^-$) in an aqueous solution. The liquid sorbent may for example be a caustic alkaline solution (e.g., NaOH or KOH), or an amine based solvent (e.g., aqueous alkanolamine (e.g. tri-ethyl amine), diethanolamine (DEA), monoethanolamine (MEA), Methyldiethanolamine (MDEA), Diisopropanolamine (DIPA) and Aminoethoxyethanol (Diglycolamine) (DGA)). The bicarbonate solution may be supplied as a catholyte for use in electrochemical method 10.

In some embodiments, electrochemical method 10 is combined with an upstream hydrogen gas production process. In one example method, hydrogen gas is produced from natural gas. The method involves heating the natural gas and reacting the heated natural gas with steam ($H_2O$) in the presence of a catalyst such as nickel. This reaction forms CO and $H_2$. Other hydrogen gas production processes include for example biomass gasification (e.g., method which involves heating the organic material and reacting the heated organic material with oxygen ($O_2$) and steam ($H_2O$) to produce H2 and CO2), and water electrolysis (e.g., method of applying an electrical potential to split water ($H_2O$) into hydrogen ($H_2$) and oxygen ($O_2$)).

The invention is further described with reference to the following specific examples, which are not meant to limit the invention, but rather to further illustrate it.

EXAMPLES

An electrochemical cell of the type illustrated in FIG. 3 and the method of performing electrolysis illustrated in FIGS. 1 and 2 were used to convert liquid bicarbonate ($KHCO_3$) to useful compounds. In the example embodiment, cathode 106 comprises a free-standing silver foam. Anode 108 is a gas diffusion electrode (GDE). Anode 108 comprises platinum supported on carbon black. Ion exchange membrane 110 may be a cation exchange membrane. This system is also referred to herein as the HOR-|Nafion|$HCO_3^-$ system.

Figure 5:
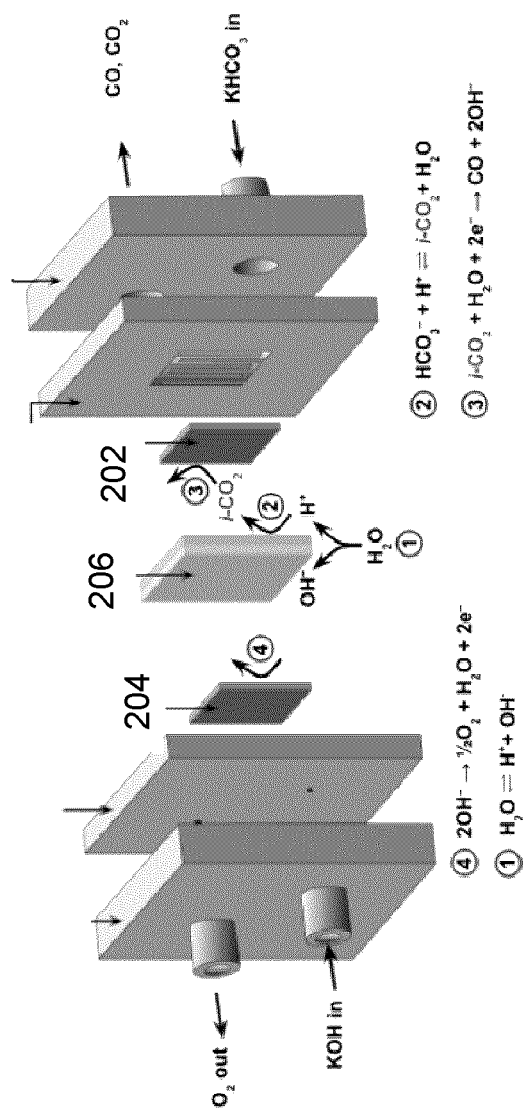
FIG. 5 is an exploded perspective view of an example bipolar membrane-based electrolyzer ("OER|BPM|HCO$_3^-$") that is used as a control system in the comparative experiments described in the Examples section.

An electrochemical cell of the type illustrated in FIG. 5 was used as a control system to convert liquid bicarbonate ($KHCO_3$) to gaseous carbon dioxide ($CO_{2(g)}$) for comparative purposes. The control system comprises an electrochemical cell 200. Electrochemical cell 200 comprises a cathode 202 and an anode 204. Cathode 202 and anode 204 are separated by a bipolar membrane (BPM) 206. In the example embodiment, cathode 202 comprises a free-standing silver foam. Anode 204 comprises a free-standing nickel foam. BPM 206 has a thickness of 195 μm. The anolyte electrolyte used in the example embodiment is potassium hydroxide (KOH). This system is also referred to as the OER|BPM|$HCO_3^-$ system.

An example method of operating the OER|BPM|$HCO_3^-$ system comprises applying an electrical potential between anode 204 and cathode 202. Application of the electrical potential causes water to dissociate into hydroxide ions ($OH^-$) and protons (H+) at BPM 206. Protons (H+) may permeate through the cation exchange layer of BPM 206 to travel toward cathode 202. Protons (H+) may react with bicarbonate ions at cathode 202 to form useful products. Hydroxide ions (OH−) may permeate through the anion exchange layer of BPM 206 toward anode 204. Hydroxide ions (OH−) may participate in an oxidation reaction at anode 204 to form one or more oxidized products.

Example 1

Figure 7:
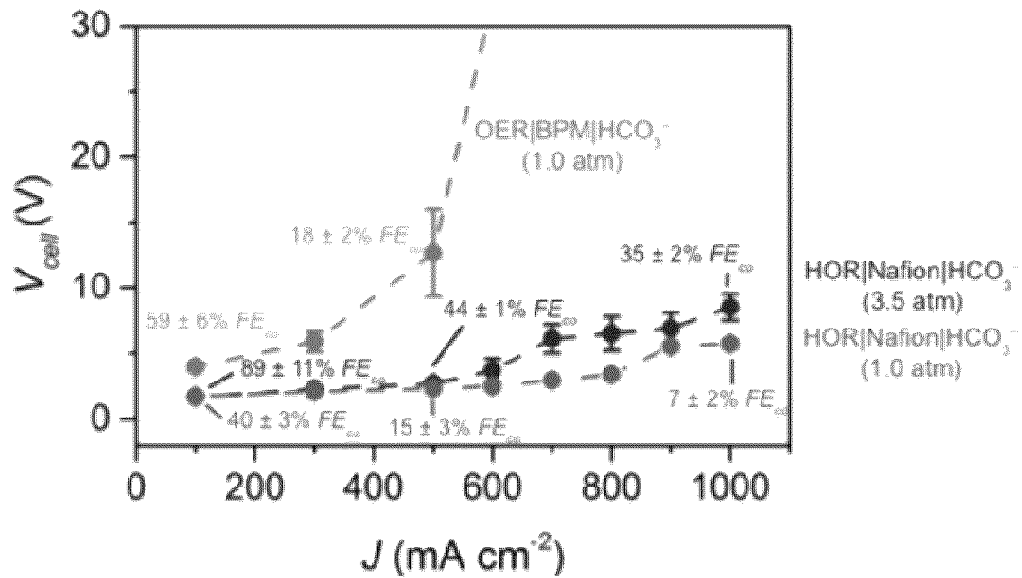
FIG. 7 is a graph comparing the cell voltage ($V_{cell}$) values measured as a function of partial current density for the electrolysis of bicarbonate using the FIG. 5 control system at an operating pressure of 1.0 atm and the electrolysis of bicarbonate operating the FIG. 1 method using the FIG. 3 electrolyzer at an operating pressure of 1.0 and 3.5 atm. Cation exchange membranes of different thicknesses were tested using the FIG. 3 electrolyzer. The cation exchange membrane used for the electrolysis at an operating pressure of 1.0 atm has a thickness of 25 μm. The cation exchange membrane used for the electrolysis at an operating pressure of 3.5 atm has a thickness of 50 μm.

FIG. 7 is a graph comparing the cell voltage ($V_{cell}$) values measured as a function of current density for the electrolysis of bicarbonate using the OER|BPM|$HCO_3^-$ control system and the HOR|Nafion|$HCO_3^-$ system. The electrolysis using the OER|BPM|$HCO_3^-$ control system was operated at a pressure of 1.0 atm. The electrolysis using the HOR|Nafion|$HCO_3^-$ system was operated at two different pressures for comparison, specifically at pressures of 1.0 atm and 3.5 atm. Cation exchange membranes of different thicknesses were used for the electrolysis using the HOR|Nafion|$HCO_3^-$ system at the different operating pressures. The cation exchange membrane used for the electrolysis at an operating pressure of 1.0 atm has a thickness of 25 μm. The cation exchange membrane used for the electrolysis at an operating pressure of 3.5 atm has a thickness of 50 μm.

Figure 6:
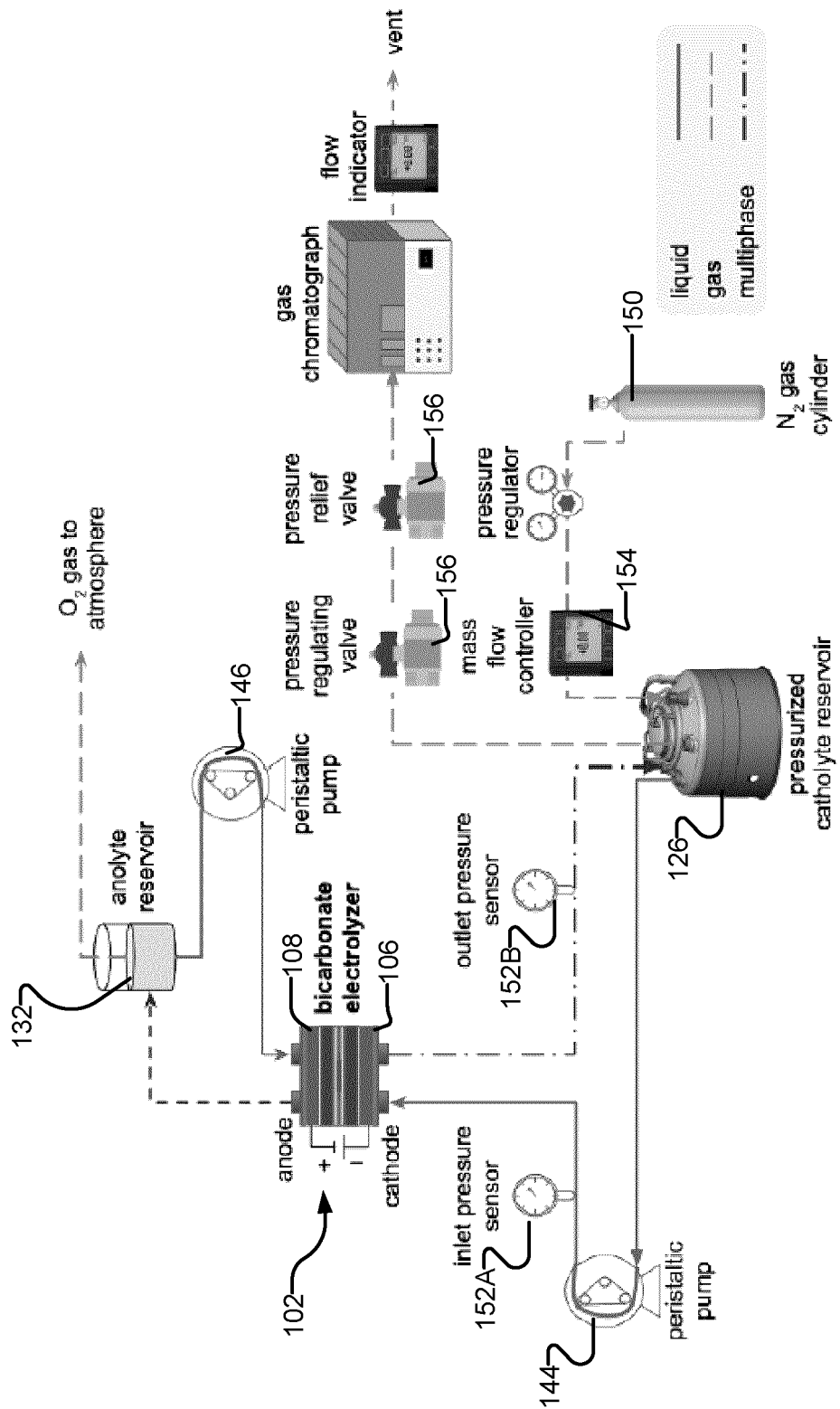
FIG. 6 is a schematic diagram depicting a pressurized bicarbonate electrolyzer system according to an example embodiment of the invention.

The electrolysis using the HOR|Nafion|$HCO_3^-$ system at the operating pressure of 3.5 atm was performed by supplying a gas to the catholyte reservoir containing bicarbonate solution to pressurize the solution before supplying the solution to the cathode. An example illustration is shown schematically in FIG. 6.

The results show that the control system required $V_{cell}$ of 4.0±0.3V in order to maintain a current density of 100 mA $cm^{-2}$. This value is more than twice as high as the HOR|Nafion|$HCO_3^-$ system that performs HOR at the anode. The $V_{cell}$ of the control system spiked to 12.7±3.3V at 500 mA $cm^{-2}$, whereas the $V_{cell}$ of the HOR|Nafion|$HCO_3^-$ system was at 2.3±0.1 V at the same current density.

Figure 9:
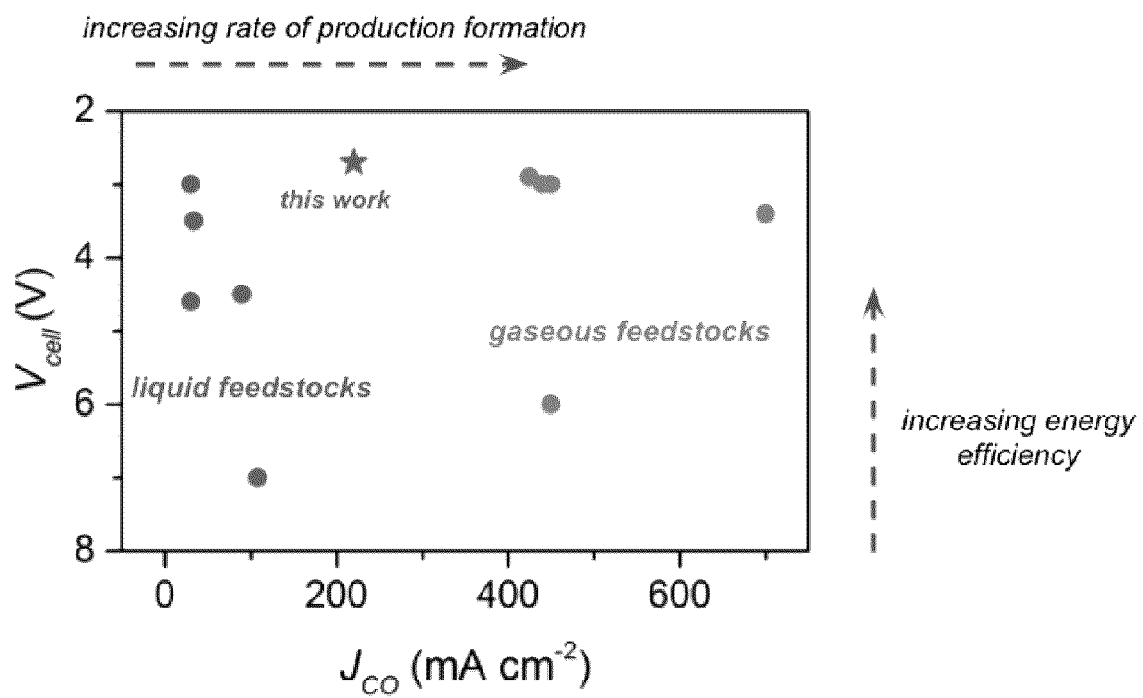
FIG. 9 is a plot of the cell voltage ($V_{cell}$) values measured as a function of current density (mA cm$^{-2}$) from using conventional methods of electrolyzing CO2 compared to from using the FIG. 1 method of electrolyzing CO2.

The results show that the pressurized HOR|Nafion|$HCO_3^-$ system at 3.5 atm yielded a $FE_{CO}$ of 89±11% at 100 mA $cm^{-2}$ and 44±1% at 500 mA $cm^{-2}$. The molar composition of the gasses in the cathode outlet stream at 500 mA $cm^{-2}$ was $CO_2(g)$ (30%), CO(g) (22%), H2(g) (48%). The HOR|Nafion|$HCO_3^-$ system achieved a partial current density for CO ($J_{CO}$) of about 200 mA $cm^{-2}$, which is higher than values reported for CO2RR electrolyzers which use a liquid feedstock (as shown in the FIG. 9 plot). The $CO_2$ utilization value was measured to be 40±2%.

Figure 8:
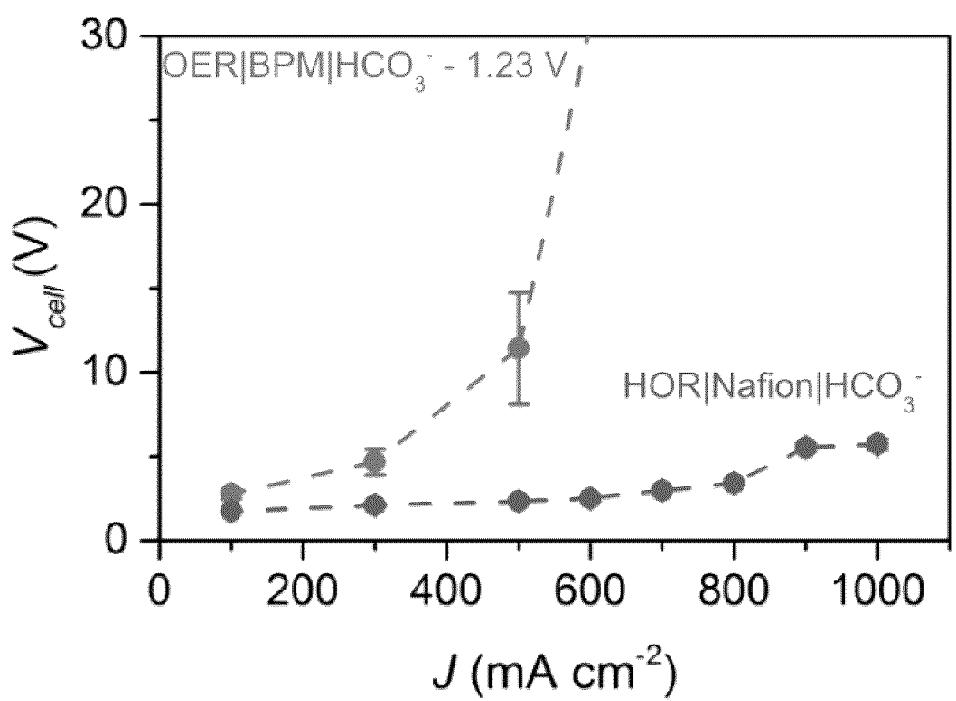
FIG. 8 is a plot of the modified cell voltage ($V_{cell}$) values measured as a function of current density from the electrolysis of bicarbonate obtained from using the FIG. 5 control system compared to the values obtained from using the FIG. 3 electrolyzer. Both of the electrolysis occurred under an operating pressure of 1.0 atm. The modified cell voltages ($V_{cell}$) values were calculated by subtracting the thermodynamic 1.23 V OER potential from the control system.

FIG. 8 is a graph comparing the modified cell voltage ($V_{cell}$) values measured as a function of current density of the electrolysis of bicarbonate using the FIG. 5 control system and the electrolysis of bicarbonate using the FIG. 3 flow electrolyzer. Both of the electrolysis occurred under an operating pressure of 1.0 atm. The modified cell voltages ($V_{cell}$) values were calculated by subtracting the thermodynamic 1.23 V OER potential from the control system.

Example 2

Figure 10:
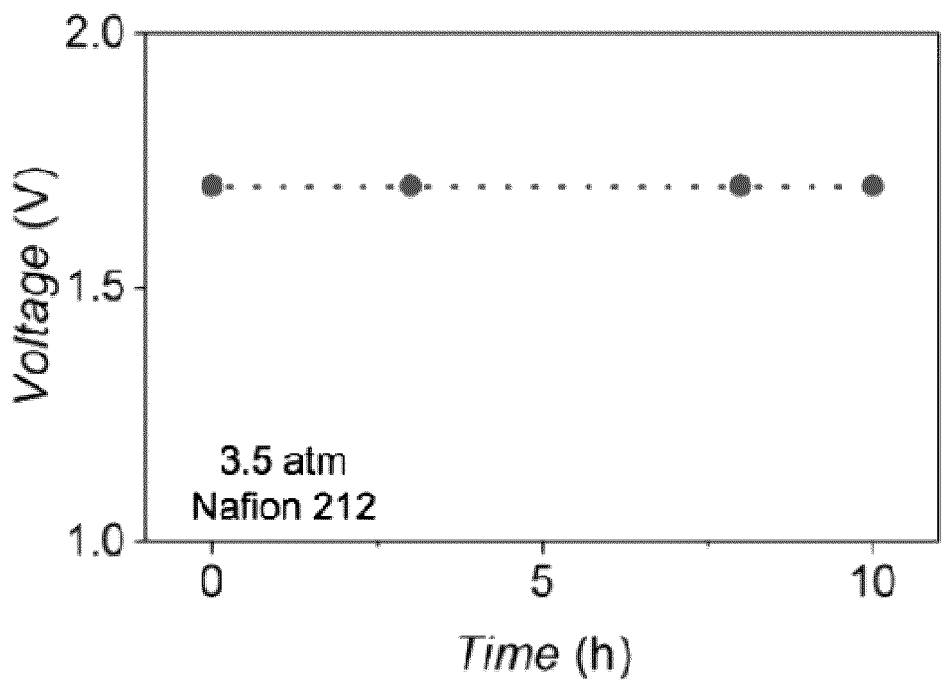
FIG. 10 is a plot of the cell voltage (V) measured as a function of time (h) showing the voltage changes during a 10 hour electrolysis of bicarbonate using the FIG. 1 method at a current density of 100 mA cm$^{-2}$.
Figure 11A:
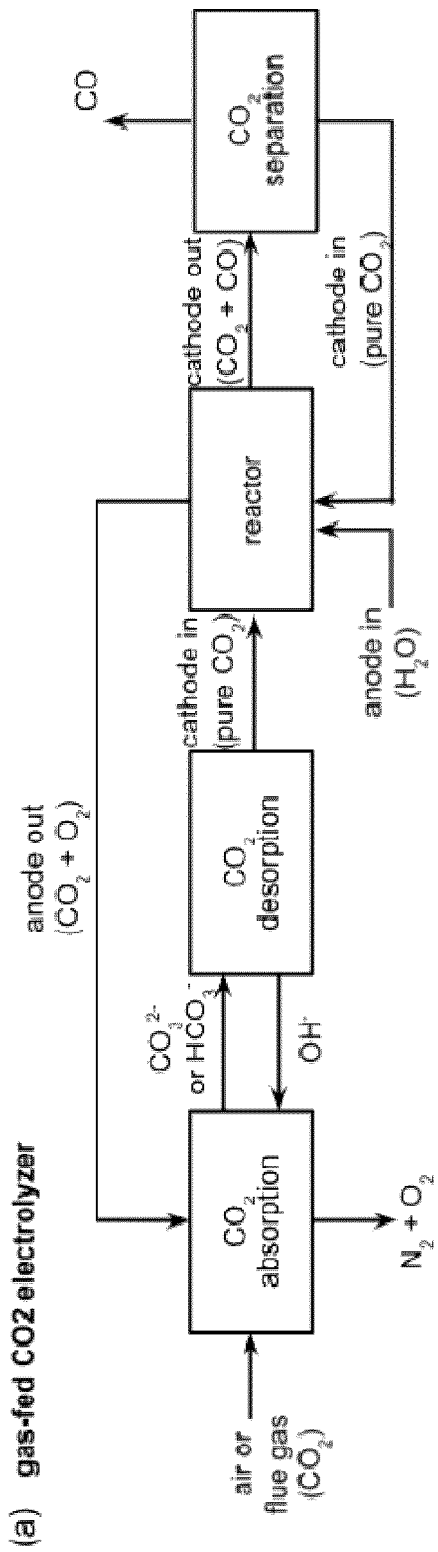
FIG. 11A is a process flow diagram showing an example process of converting carbon dioxide emissions to useful compounds from the electrochemical reduction of gaseous $CO_2$.
Figure 11B:
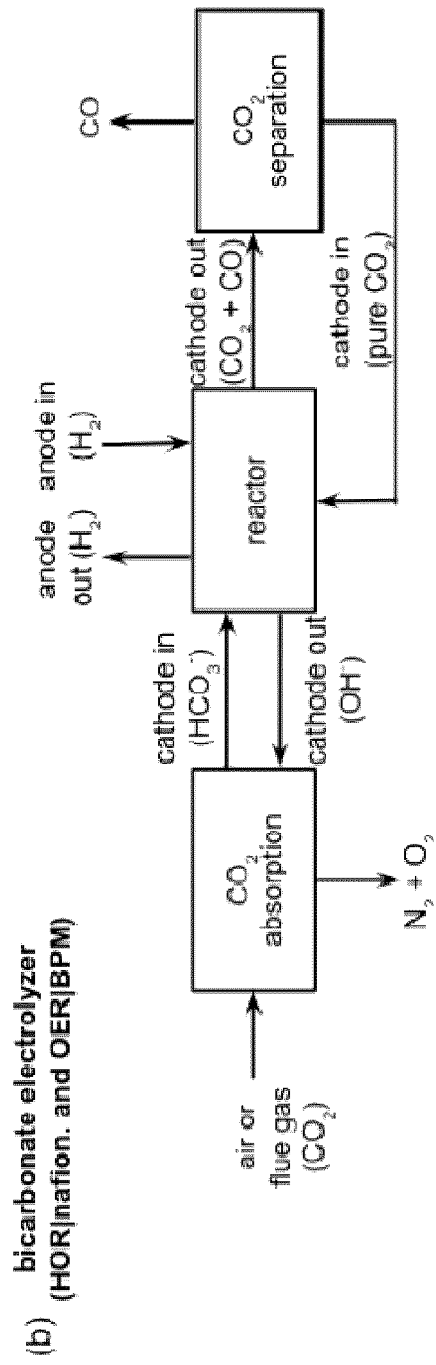
FIG. 11B is a process flow diagram showing an example process of converting carbon dioxide emissions to useful compounds from the electrochemical reduction of bicarbonate solution.

The stability of the HOR|Nafion|$HCO_3^-$ system was tested by measuring the voltage change during a 10 hour bicarbonate electrolysis at 100 mA $cm^{-2}$ at an operating pressure of 3.5 atm. FIG. 10 is a plot of the cell voltage (V) as a function of time (h) showing the voltage changes during the 10 hour electrolysis. The results show that the cell voltage was stable at 1.7 V. This shows that the system is stable for 10 hours.

Example 3

Figure 12A:
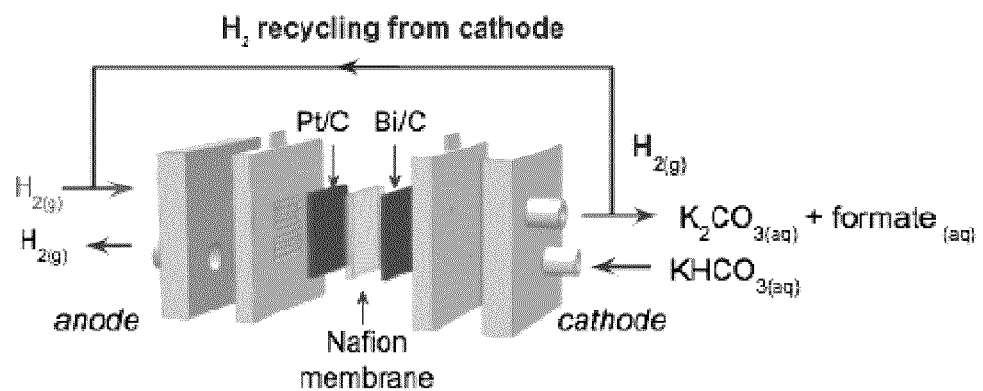
FIG. 12A is an exploded perspective view of an example flow electrolyzer showing a recycle stream that delivers H2 produced at cathode to the anode according to an example embodiment of the invention.

FIG. 12A is an exploded perspective view of an example HOR|Nafion|$HCO_3^-$ system showing a recycle stream that delivers H2 produced at cathode 106 to anode 108. In this example, cathode 106 comprises bismuth (Bi/C) based electrode to favor the formation of formate. Anode 108 is a gas diffusion electrode (GDE). Anode 108 comprises platinum supported on carbon black. In this example, the cathodic product stream was directly recycled into anode 108 with KOH solutions to remove the excessive in situ generated CO2.

Figure 12B:
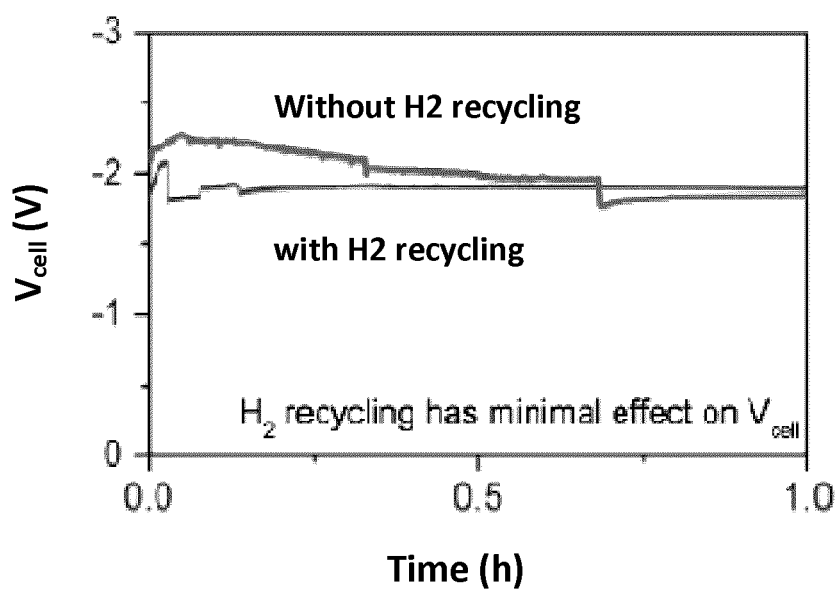
FIG. 12B is a plot of the cell voltage (V) as a function of time (h) measured at a current density of 100 mA cm$^{-2}$ for one hour comparing the $V_{cell}$ profiles of bicarbonate electrolysis using fresh $H_2$ feedback and with recycled $H_2$ from the cathode.
Figure 13:
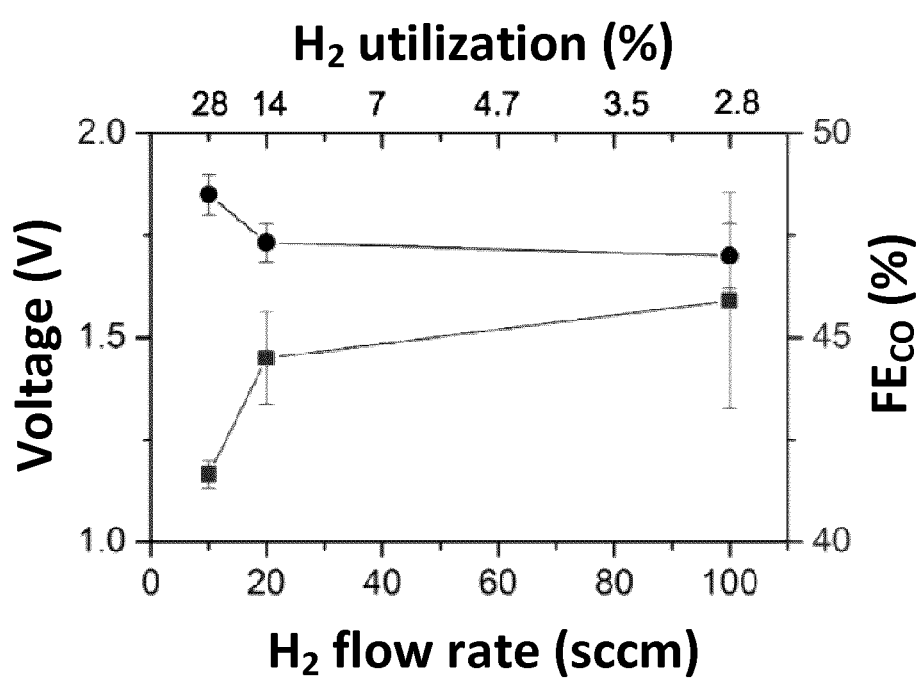
FIG. 13 is a plot showing the impact of flow rate of $H_2$ on the cell voltage and $FE_{CO}$ in operating the FIG. 1 method at a constant current density of 500 mA cm$^{-2}$.

FIG. 12B is a plot of the cell voltage (V) as a function of time (h) measured at a current density of 100 mA $cm^{-2}$ for one hour comparing the $V_{cell}$ profiles of bicarbonate electrolysis using fresh $H_2$ feedback and with recycled H2 from the cathode.

FIG. 12B shows that the $H_2$ recycling has minimal effect on the cell voltage over one hour of electrolysis. The results suggest that the recycling strategy is effective for reducing $H_2$ cost and increasing $H_2$ utilization.

Example 4

The difference in i-CO2 released between the OER|BPM|$HCO_3^-$ and HOR|Nafion|$HCO_3^-$ systems during constant current density electrolysis at 100 mA $cm^{-2}$ was measured. The results showed that the OER|BPM|$HCO_3^-$ system produced more i-CO2 than the HOR|Nafion|$HCO_3^-$ system (Table 1 below). The results also suggest that differences in CO2 supply to the cathode may be the cause of the different $FE_{CO}$ values observed between the OER|BPM|$HCO_3^-$ and HOR|Nafion|$HCO_3^-$ systems.

A hypothesis is that anionic crossover from cathode to anode in a bicarbonate electrolyzer may cause a reduction in the flux of H+ to the cathode because the total ionic flux is constrained by the current density. BPMs have been shown to limit crossover relative to Nafion membranes because water splitting (which drives H+) dominates at high current densities relative to co- and counter-ion transport. It is expected that protons are responsible for more ionic charge transport in the OER|BPM|$HCO_3^-$ system than the HOR|Nafion|$HCO_3^-$ system.

TABLE S1 i-CO$_2$ measured from the electrolyzer with different membranes at 100 mA $cm^{-2}$.

| | OER|BPM|$HCO_3^-$ | HOR|Nafion 212|$HCO_3^-$ |
|---|---|---|
| i-CO$_2$ (sccm) at 100 mA $cm^{-2}$, 1 atm | 4.0 ± 0.5 | 3.7 ± 0.4 |

Example 5

The coupling of a HOR reaction at the anode with the reduction of carbonate at the cathode using an electrolyzer to produce C2 compounds was tested. In this experiment, cathode 106 comprises a free-standing copper (Cu) foam. Anode 108 comprises a Pt/C furnishing carbon composite electrode. Ion exchange membrane 110 is a cation exchange membrane sold under the trademark Nafion™ 212. Hydrogen gas ($H_2$) was delivered to anode 108 at a flow rate of about 150 sccm. The catholyte comprises 1 M potassium carbonate ($K_2CO_3$). The potassium carbonate was delivered to cathode 106 at a flow rate of about 50 mL $min^{-1}$. The sampling time was about 20 minutes. The electrical potential applied between cathode 106 and anode 108 was between 1.9 V and 2.1 V.

Figure 14:
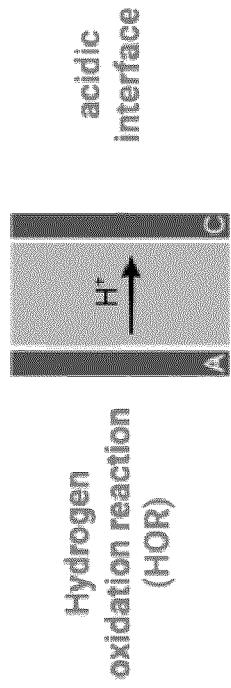
FIG. 14 is a schematic diagram illustrating the thermodynamic potentials (vs. SHE) determined using the Nernst equation for the FIG. 1 method compared to the control system. The pH value of 10 for the $CO_2RR$ was estimated from previously reported in situ spectroscopy measurements.
Figure 14:
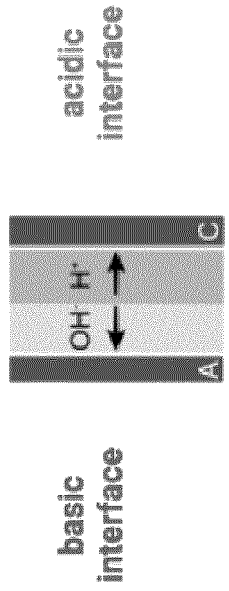
Figure 14A:
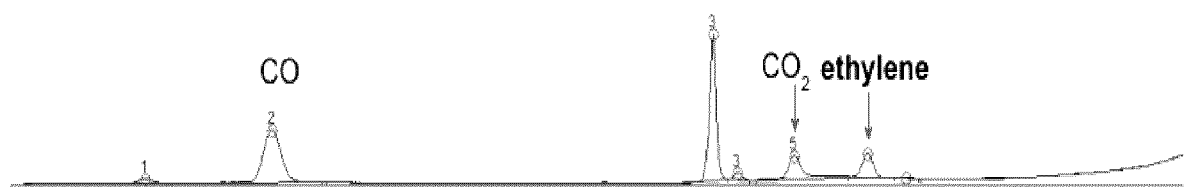
FIG. 14A is a chromatogram showing example products produced from the using the FIG. 3 electrolyzer to electrolyze $CO_2$.

The products were measured by gas chromatography, and the results are shown in FIG. 14A. The results show that ethylene is present in the products. The measured faradaic efficiency for ethylene ($FE_{ethylene}$) production was 1.5% at a current density of 250 mA $cm^{-2}$.

Other Materials

The $CO_2$ reduction reaction (CO2RR) is a means of using electricity to convert $CO_2$ into fuels and chemicals. A commercial $CO_2RR$ electrolyzer will likely need to operate at current densities (J) greater than 200 mA $cm^{-2}$ and cell voltages ($V_{cell}$) below 3 V. The highest-performing $CO_2RR$ lab-scale electrolyzers are now capable of meeting these criteria when a pure gaseous $CO_2$ feedstock is used. However, $CO_2RR$ electrolyzers must be effectively integrated with upstream carbon capture units (as well as downstream processes) to minimize capital and operational costs. A gaseous $CO_2$ feedstock will inevitably require $CO_2$ isolation and compression steps. The isolation of $CO_2$ from air capture streams, for example, requires a series of reactions that require significant energy (e.g., 22.8 MJ to convert 100 mol of $K_2CO_3$ into $CO_2$). The compression of $CO_2$ (2.0 MJ/100 mol $CO_2$) not only requires one-sixth the energy required for electrolysis (12.4 MJ/100 mol $CO_2$), but it also requires significant capital expenditures ($1-10 million USD/MW).

Finally, electrolytic $CO_2RR$ produces $OH^-$, which reacts with >70% of consumed $CO_2$ to form unreactive (bi)carbonates (Eq. 1A). Consequently, <20% of gaseous $CO_2$ is actually converted to product as it passes through the cathode compartment of a $CO_2RR$ electrolyzer.

$$2OH^-_{(aq)} + CO_{2(g)} \leftrightharpoons CO_3^{2-}_{(aq)} + H_2O_{(l)} \qquad \text{Eq. 1A}$$

The inventors sought to bypass these challenges by developing a $CO_2RR$ electrolyzer that uses a liquid bicarbonate feed instead of gaseous $CO_2$. The efficient electrolysis of bicarbonate solutions (e.g., $KHCO_3$(aq)) can form the same $CO_2RR$ products as an electrolyzer fed with gaseous $CO_2$, but without the need for $CO_2$ regeneration and pressurization.

Some embodiments of the invention do not use oxygen evolution reaction (OER) at the anode. Some embodiments use hydrogen oxidation reaction (HOR) at the anode. HOR facilitates the use of reduced applied potential difference across the cathode and the anode in the electrolysis of bicarbonate while achieving high current density.

The standard half-cell potential (E0) for the hydrogen oxidation reaction (HOR; Eq. 5A) is merely 0.0 V vs. the reversible hydrogen electrode (RHE) (c.f. E0=+1.23 V vs. RHE for the OER).

$$4OH^-_{(aq)} - 4e^- \rightarrow 2H_2O_{(l)} + O_{2(g)} \qquad \text{Eq. 4A}$$

$$H_{2(g)} - 2e^- \rightarrow 2H^+_{(aq)} \qquad \text{Eq. 5A}$$

The inventors report here a $CO_2RR$ electrolyzer designed to mediate bicarbonate electrolysis at the cathode in tandem with hydrogen oxidation at the anode. This system, contains an ion exchange membrane such as a cation exchange membrane (e.g., Nafion™). The ion exchange membrane may be a perfluorinated ion-exchange membrane. The ion exchange membrane may comprise a polymer, for example a sulfonated tetrafluoroethylene based fluoropolymer-copolymer.

The ion exchange membrane separates the cathode and anode. compartments. A prototype system operates with unprecedented performance parameters: a $V_{cell}$ of about 2.2 V (1.4 V after resistance compensation) at a current density of about 500 mA cm$^{-2}$, and at a $CO_2$ utilization value of >about 25%.

Figure 16A:
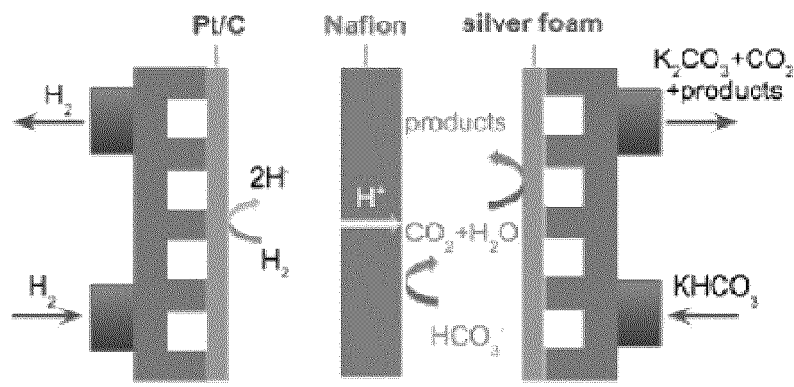
FIG. 16A is a schematic diagram illustrating the electrolyzer of FIG. 3.
Figure 16B:
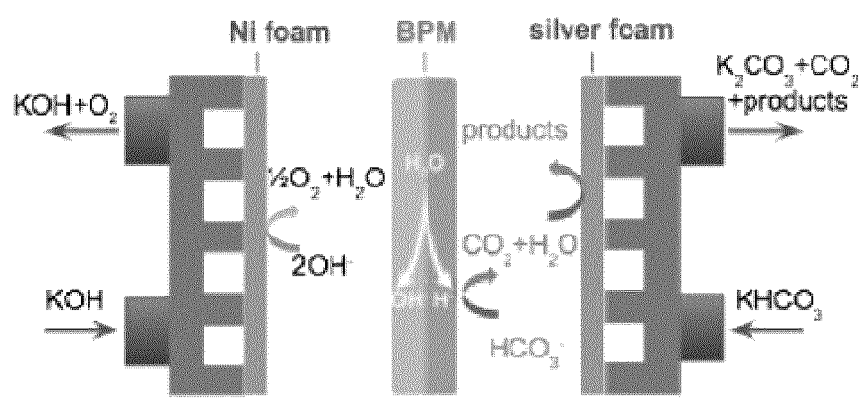
FIG. 16B is a schematic diagram illustrating the electrolyzer of FIG. 5.

This electrolyzer is configured to use the HOR at the anode to form protons. The protons are then transported through a Nafion membrane to the cathode compartment for reaction with bicarbonate to form products, including $CO_2$ (FIGS. 16A, 16B). The $CO_2$ is formed at an electrocatalyst surface. The $CO_2$ is therefore positioned to be reduced to form $CO_2RR$ products such as CO.

In some embodiments the system comprises a "zero-gap" electrolyzer. A zero gap electrolyzer (denoted "HOR-|Nafion|HCO$_3^-$" to indicate the anode|membrane|cathode configuration) presses the anode and cathode tightly against opposite faces of a membrane (e.g. a Nafion membrane). The membrane may, for example, have a thickness of about 25 µm. Flowplates with serpentine channels may be used to deliver humidified $H_2$ gas and an aqueous solution containing biocarbonate ions (e.g., 3 M $KHCO_3$) to the anode and cathode, respectively (FIG. 3).

The anode may comprise a gas diffusion electrode (GDE). The GDE may, for example comprise a platinum (Pt) catalyst supported on carbon black. A metallic (e.g., silver) foam electrode may be used in the cathode chamber. The metallic foam electrode may be porous. In some embodiments, the cathode comprises a GDE. The GDE may be coated with bismuth.

The prototype electrolyzer was used to perform electrolysis experiments at applied current densities over a 100 to 1000 mA cm$^{-2}$ range. Product formation rates of CO and $H_2$ from the cathode compartment along with $V_{cell}$ (the full cell voltage measured across the anode and cathode) were recorded over the course of the electrolysis experiments.

Figure 17:
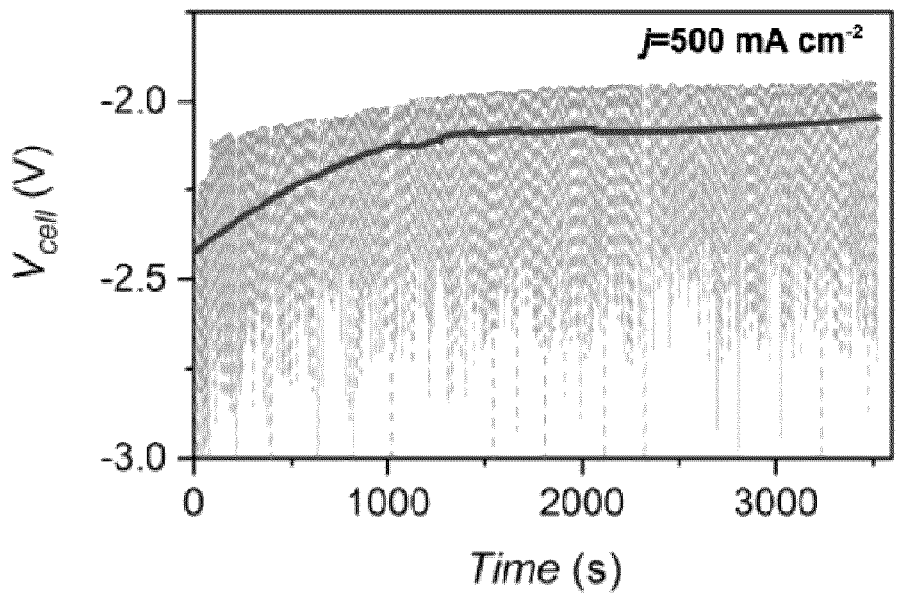
FIG. 17 is a plot of the $V_{cell}$ values (V) measured as a function of time (s) obtained from operating the FIG. 3 electrolyzer with a 25 μm membrane at 500 mA cm$^{-2}$ for 1 hour.
Figure 18:
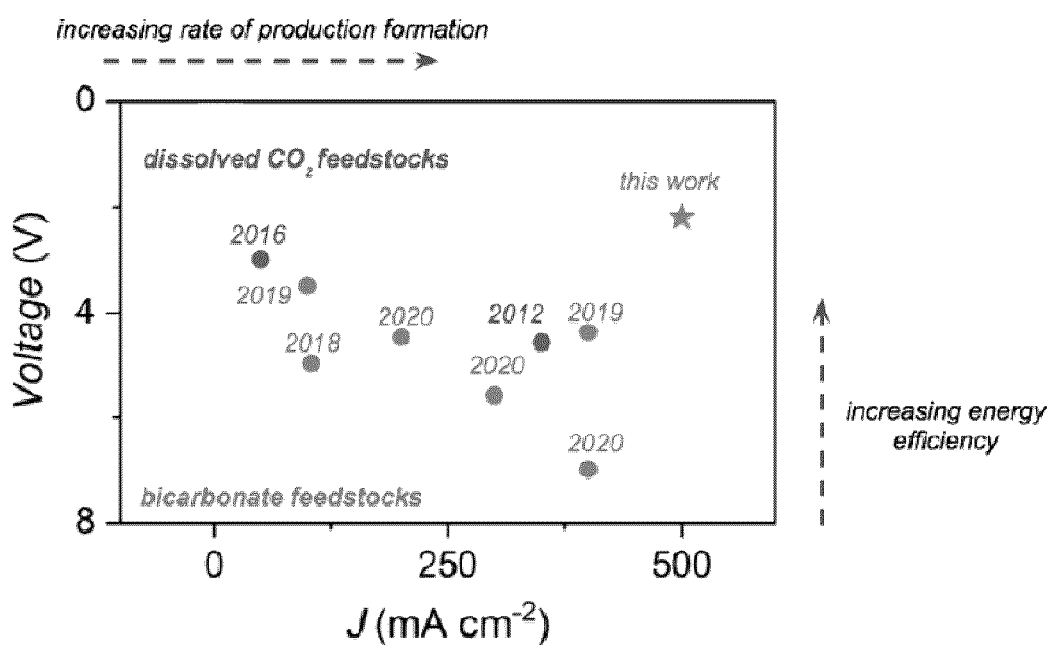
FIG. 18 is a graph showing the current density and voltage values obtained from reducing $CO_2$ using conventional systems compared with the values obtained from reducing $CO_2$ using the electrolyzer of FIG. 3.
Figure 19:
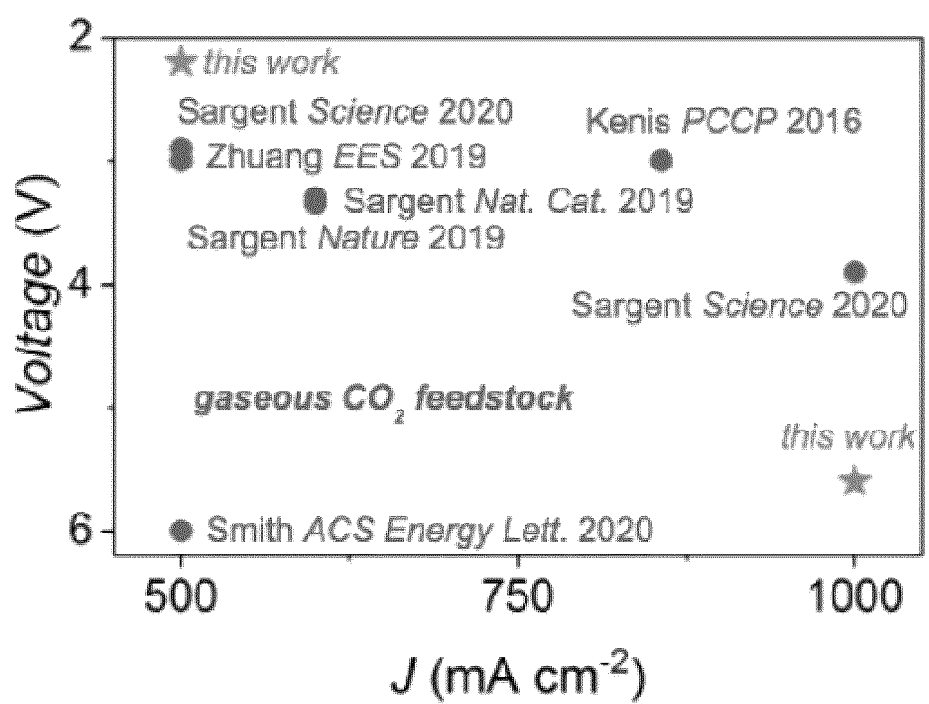
FIG. 19 is a graph showing the current density and voltage values obtained from reducing $CO_2$ using conventional systems compared with the values obtained from reducing $CO_2$ using the electrolyzer of FIG. 3.

Using this reactor architecture, an electrolysis experiment at an applied current density of 100 mA cm$^{-2}$ yielded a $V_{cell}$ of 1.7 V. When the current density was held at 500 mA cm$^{-2}$ for 1 h, the measured $V_{cell}$ was held below 2.2 V for the duration of the experiment (FIG. 17), which also sets a new benchmark for $CO_2RR$ electrolysis (FIGS. 18 and 19). Importantly, the $CO_2$ utilization values were measured to be >25% at about 500 mA cm$^{-2}$.

Figure 15:
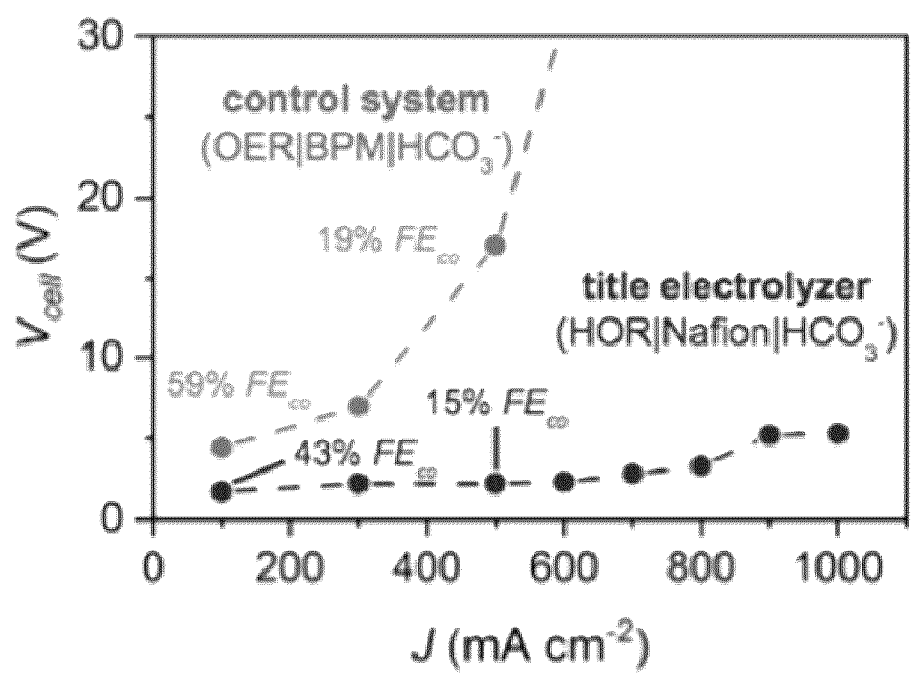
FIG. 15 is a plot of the $V_{cell}$ values measured as a function of current density (mA cm$^{-2}$) from using conventional methods of electrolyzing $CO_2$ compared to from using the FIG. 1 method of electrolyzing $CO_2$.

The inventors have benchmarked these $V_{cell}$ values against those obtained with our previously reported bicarbonate electrolyzer. This control system ("OER|BPM|HCO3$^-$") contains a bipolar membrane (instead of Nafion) and mediates OER at a nickel anode (instead of HOR at a platinum anode). In order to maintain a current density of 100 mA cm$^{-2}$, the control system required a $V_{cell}$ of 4.4 V. This value is more than twice as high as our new electrolyzer that performs HOR at the anode. The $V_{cell}$ of the control system spiked to 18 V at 500 mA cm$^{-2}$, whereas the $V_{cell}$ of our new electrolyzer was only 2.2 V at the same current density (FIG. 15). The voltage penalties for water dissociation and the OER render the $V_{cell}$ of the control system impractical for industrially-relevant current densities (i.e., J>200 mA cm$^{-2}$).

While the $V_{cell}$ and $CO_2$ utilization values from our electrolyzer that couples bicarbonate reduction and HOR are state-of-the-art, the prototype system had measured faradaic efficiencies for CO production ($FE_{CO}$) of only 43% at 100 mA cm$^{-2}$ (15% at 500 mA cm$^{-2}$; FIG. 15).

Thicker Nafion membranes were tested in an attempt to drive a higher proton flux through the membrane. Results did not show any meaningful changes in $FE_{CO}$ values for membrane thicknesses of 25 and 50 µm.

Figure 20A:
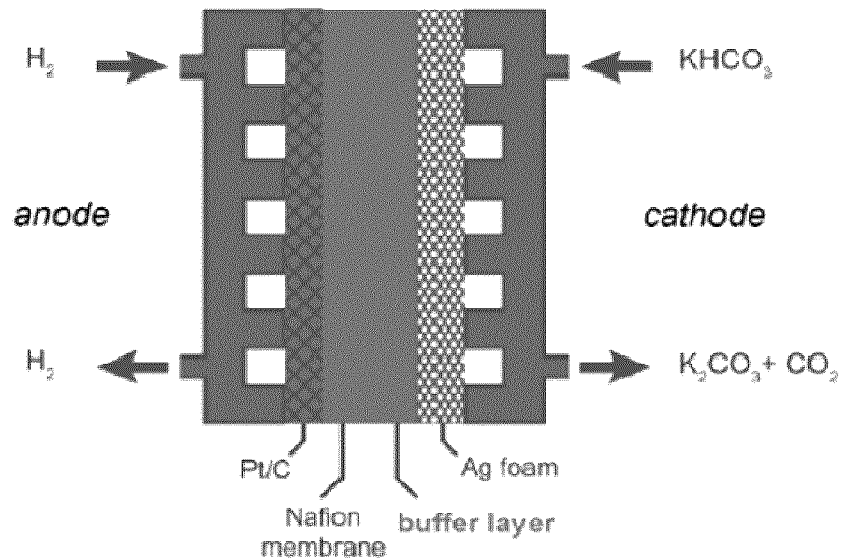
FIG. 20A is a schematic diagram of a bicarbonate electrolyzer comprising a buffer layer arranged between the ion exchange membrane and the cathode.
Figure 20B:
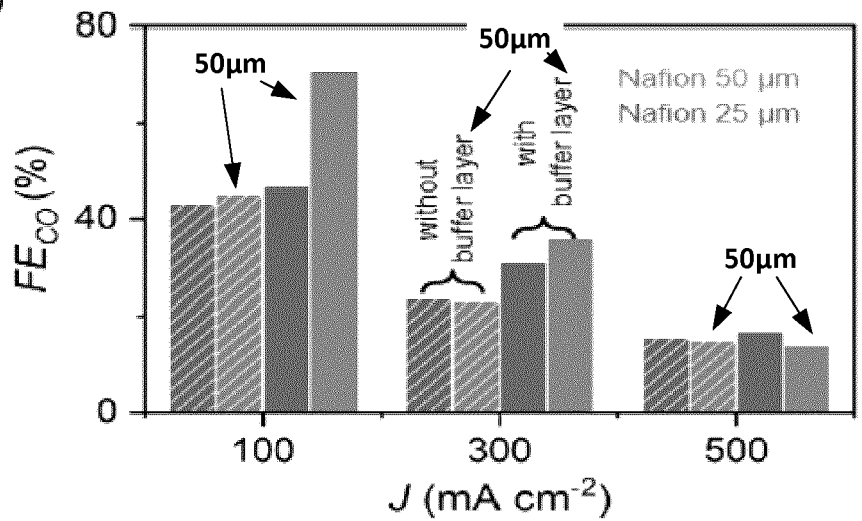
FIG. 20B is graph showing the $FE_{CO}$ values measured at 100, 300 and 500 mA cm$^{-2}$ from operating the FIG. 20A electrolyzer comprising an ion exchange membrane with thicknesses of 25 μm and 50 μm with and without the buffer layer.

In some embodiments, higher $FE_{CO}$ values are achieved upon integration of a microfluidic buffer layer between the silver foam cathode and Nafion membrane (FIGS. 20A, 20B). The microfluidic buffer layer comprises a microfluidic channel through which the protons flow. The microfluidic buffer layer may, for example, have a thickness of about 500-µm. This buffer layer may facilitate suppression of hydrogen evolution reaction (HER) by inhibiting H+ transport from the membrane to the surface of the cathode (Eq. 5A). Our experiments corroborated this effect, as the $FE_{CO}$ increased from 47% to 71% at an applied current density 100 mA cm$^{-2}$ with the thicker 50-µm membrane (FIGS. 20A, 20B).

Figure 21:
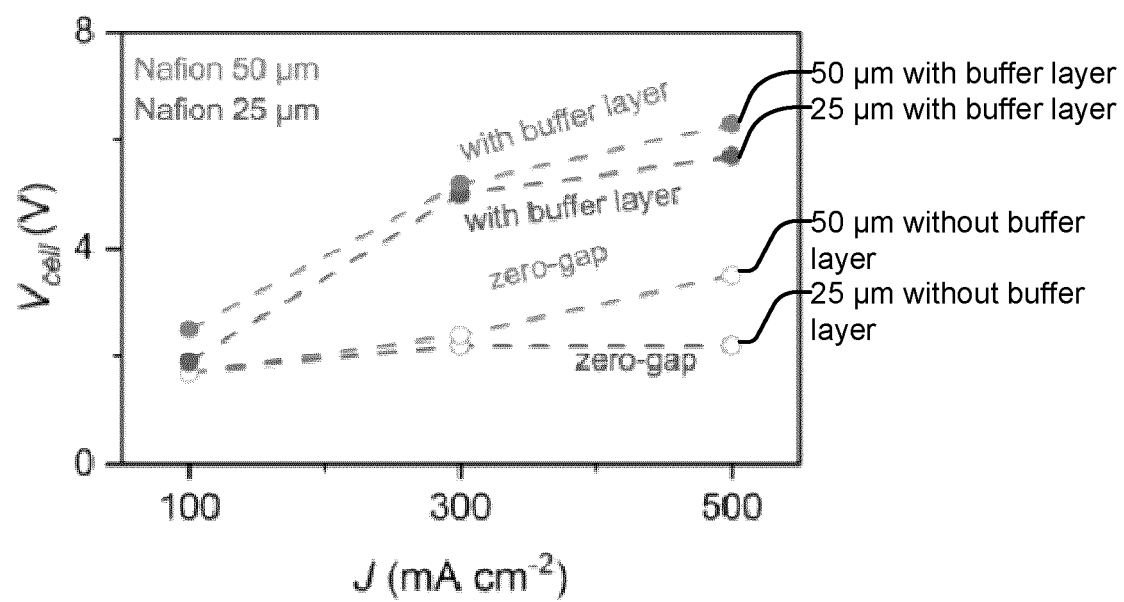
FIG. 21 is a plot of the $V_{cell}$ values measured as a function of current density (mA cm$^{-2}$) comparing the performance of a bicarbonate electrolyzer with and without a buffer layer arranged between the ion exchange membrane and the cathode.

Notwithstanding, there is a substantial voltage penalty at high current densities when the buffer layer is used (FIG. 21). Electrocatalysts that favor CO2RR over HER in acidic media will be useful to increase $FE_{CO}$.

Figure 22A:
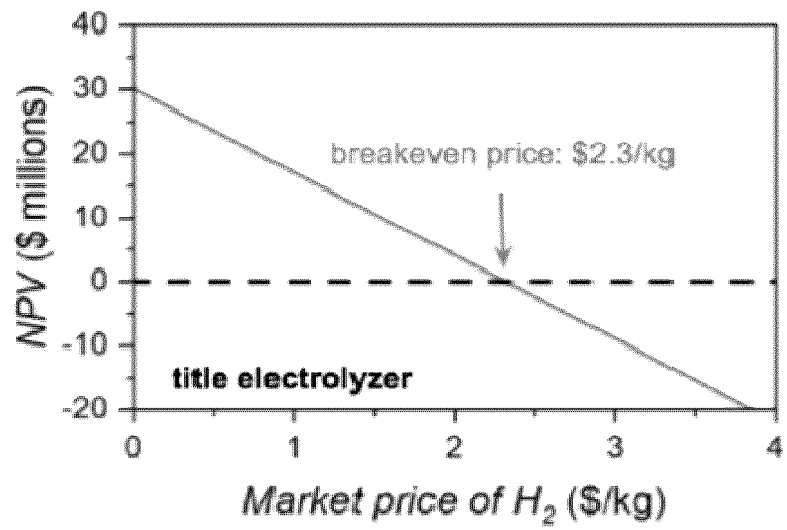
FIG. 22A is a plot of the 20 year net present value (NPV) measured as a function of H2 market price for the FIG. 3 electrolyzer from producing 100 tons of CO per day.
Figure 22B:
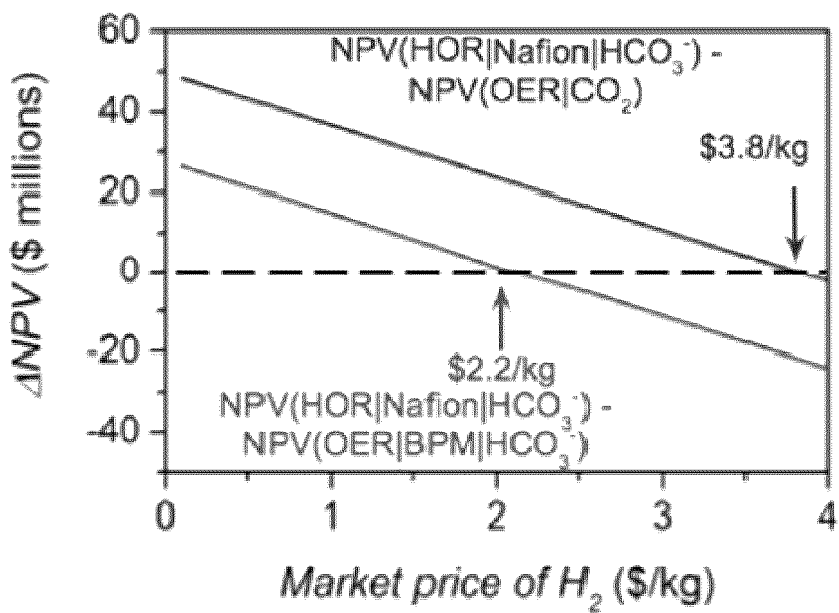
FIG. 22B is a graph showing the NPV difference between the FIG. 3 electrolyzer, the FIG. 5 control system and a gaseous CO$_2$-fed electrolyzer measured as a function of H2 market price.

In some embodiments, the anode chamber is fed with $H_2$ gas instead of aqueous media (e.g., NaOH). In such embodiments, $H_2$ is produced by the electrolysis of water or the steam-methane reformation (SMR) of natural gas. The techno-economic analysis (TEA) shows that an electrolyzer as described herein can produce CO profitably if the price of $H_2$ gas remains below $2.3/kg (FIGS. 22A, 22B, see below for details), a value that is within the current price range of $H_2$ produced by SMR (i.e., $1.0-2.4/kg). The inventors calculate that bicarbonate electrolysis coupled with $H_2$ produced by SMR is carbon-negative if the $H_2$ utilization value is >32% (See below for details). $H_2$ utilization values >70% are expected based on related hydrogen fuel cell studies.

In some embodiments an electrolyzer as described herein is coupled to industrial processes (e.g., chlor-alkali process, chlorate production) where $H_2$ is generated as a waste by-product, and thus $H_2(g)$ could be provided at an even lower cost. In some embodiments $H_2(g)$ is recycled to further minimize the cost of using $H_2(g)$.

Results of the experiments shown in FIGS. 12A, 12B show that producing a liquid product (e.g., formate) enables $H_2(g)$ produced by HER to be recycled, thereby reducing the amount of virgin $H_2$ supplied to the system.

We demonstrate here an electrolyzer that mediates the conversion of bicarbonate into CO (or formate) at the $CO_2$ utilization values >25% at 500 mA $cm^{-2}$. By sourcing protons from the HOR instead of the OER, this electrolyzer requires merely about 2.2 V to drive bicarbonate electrolysis at about 500 mA $cm^{-2}$. Moreover, we show that the $FE_{CO}$ of the electrolyzer can be increased to 71% at 100 mA $cm^{-2}$ by integrating a 500-μm buffer layer between the silver foam cathode and Nafion membrane to slow the competitive HER. With these performance parameters, our TEA shows that this new electrolyzer can produce CO economically at the market price for $H_2$ gas. These findings demonstrate a practical method for producing value-added carbon products from bicarbonate solutions with high energy efficiency.

Materials and Methods

In the prototypes and experiments described herein, the materials that were used to construct an electrochemical cell of the type illustrated in FIG. 3 and the control system of the type illustrated in FIG. 5 are described below. The methods of operating the systems to reduce bicarbonate and the calculations of the results obtained therefrom are also described.

$KHCO_3$ (99.5%, Alfa Aesar, USA), 50 wt % platinum on Vulcan XC 72 nanopowder (PK catalyst) and ethylenediaminetetraacetic acid (EDTA; 99%, Sigma Aldrich, USA) were purchased and used as received. Carbon cloth gas diffusion layers (GDLs; Sigracet 39BB), Fumasep FBM bipolar membranes (BPMs), and Nafion PFSA NR-211 and 212 were purchased from Fuel Cell Store (USA). The BPMs were stored in 1 M NaCl and the Nafion membranes were stored in 1 M KOH prior to use. Silver foams were obtained from Jiangsu Green Materials Hi-Tech. Co. Ltd. (China). Nafion® 117 solutions (5 wt %; in a mixture of lower aliphatic alcohols and water) were obtained from Sigma Aldrich, USA.

A CH instrument 660D potentiostat (USA) equipped with an Amp booster was used for all electrolysis experiments. An Ag/AgCl (3 M NaCl) reference electrode (BASi®) was used for cathode potential measurements. A gas chromatography instrument (GC; Perkin Elmer, Clarus 580), equipped with a packed MolSieve 5 Å column and a packed HayeS-epD column was used to detect CO and $H_2$ using a flame ionization detector (FID) and a thermal conductivity detector (TCD), respectively. The concentrations of the products CO and $H_2$ (ppm) in the headspace of the catholyte reservoir were quantified by calibrating the signal area for CO and $H_2$ to known concentrations of the two gases.

Electrode Preparation

The silver foam was cut into the desired dimension (2×2 cm) with a blade and washed with acetone and water. The silver foam was treated with dilute nitric acid solution (30% v/v $HNO_3$) in a 50 ml beaker for 10 s to remove the oxide layer and increase its electrochemical surface area. The etched silver foam was then washed thoroughly with deionized (DI) water and 3 M $KHCO_3$ prior to use.

To fabricate the Pt/C furnishing gas diffusion electrode (GDE), 8 mg Pt/C was added into a 2.5 ml mixture of water and isopropanol (IPA) solution (VH2O:VIPA=4:1) with 20 wt % Nafion solution (5 wt %). The ink was sonicated in a bath sonicator for 15 mins and then drop-casted onto a GDL. The fabricated GDEs were then stored in a fume hood to dry overnight.

Electrolysis

A peristaltic pump was used to deliver 1.0 M KOH to the anode of the control system at a constant flow rate of 40 ml $min^{-1}$. High purity $H_2$ (100-200 sccm, 99.999%) was humidified in a bubbler held at a constant temperature of 60° C. prior to being fed to the anode of the HOR|Nafion|$HCO_3^-$ electrolyzer (FIG. 3). Two 127-μm polytetrafluoroethylene (PTFE) gaskets were placed separately between the anode and anodic flowplate, and the cathode and cathodic flowplate to prevent leakage for all electrolyzers. The title electrolyzer was modified with a buffer layer by inserting a 500-μm PTFE gasket to form a microfluidic channel between the Nafion membrane and the cathode GDE. The catholyte (3.0 M $KHCO_3$) was delivered at a constant flow rate of 100 ml $min^{-1}$ for all electrolyzers. Gaseous products (e.g., $H_2$ and CO) in the headspace of the cathode electrolyte reservoir were delivered to an in-line gas chromatograph (GC) by a constant rate of $N_2$ at 175 sccm for quantification at 350 s. The actual flow rate of the gas mixture was measured by a flow meter positioned immediately downstream of the GC. Liquid products collected from the catholyte after 1200 s of electrolysis and quantified by $^1H$ NMR spectroscopy using potassium hydrogen phthalate as the internal standard with a calibration curve.

Faradaic Efficiency Calculation

The $FE_{CO}$ at constant current densities (100, 300, and 500 mA $cm^{-2}$) was measured by quantifying the $H_2$ and CO concentrations (for calculating mole fraction of CO in the gaseous mixture analyzed, $\chi$) using a GC. The FE of a gaseous product k was determined in accordance with Eq. S1:

$$FE_k = \frac{n_k F x_k F_m}{I} \qquad \text{Eq. S1}$$

Where $n_k$ is the number of electrons exchanged, $F$ is Faraday's constant (F=96,485 C/mol), $F_m$ is the molar flow rate in mol/s, and I is the total current in A. The molar flow rate is derived from the volume flow rate $F_v$ by the relation $F_m = pF_v/RT$, with p being the atmospheric pressure in Pa, R the ideal gas constant of 8.314 J/mol K, and T the temperature in K.

Liquid Product Detection $^1H$-NMR spectroscopy was used to identify the concentrations of formate after 20 min of electrolysis at 20° C. After the electrolysis using the etched silver foam and Bi/C furnishing electrodes, a 630-μL aliquot of the circulated catholyte was transferred to an NMR tube and mixed with 70 μL potassium hydrogen phthalate in $D_2O$ with known concentrations as the internal standard. The proton NMR spectra were collected using a 400 MHz spectrometer (Bruker AV400dir) at room temperature. The water signal was suppressed using the Watergate W5 pulse sequence with double gradient echos. A series of standard solutions with known concentrations of formate were prepared and analyzed by $^1H$ NMR, and a calibration curve was created by plotting the relative signal areas versus concentration of formate. From this method, the concentration of formate in the catholyte solution was determined and used to calculate $FE_{formate}$. For the electrolysis experiments with silver foam cathode, <1% faradaic efficiency for formate ($FE_{formate}$) was detected.

CO$_2$ Utilization Calculation

CO$_2$ utilization was calculated in accordance with Eq. S2. This quantity represents the conversion of in-situ generated CO$_2$ into CO, and therefore, the extent to which the CO is diluted with unreacted CO$_2$.

$$CO_2 \text{ utilization} = \frac{|CO|}{|CO_2|\text{outlet} + |CO|}\% \quad \text{Eq. S2}$$

where [CO] and [CO$_2$]$_{outlet}$ represent the concentrations of CO and CO$_2$ in the catholyte headspace as measured by in-line GC analysis.

Pressurized Electrolyzer Test Station

A sealed vessel with a volume of 1 gallon was designed to feed high pressure bicarbonate solution into the bicarbonate electrolyzer (FIG. S2). This vessel had 4 ports which were connected to tubing that carried the liquid inlet, liquid outlet, gas inlet, and gas outlet flows. The electrolyte reservoir was filled with 500 mL of 3.0 M KHCO$_3$ solution and the headspace was pressurized by supplying N$_2$ gas to the gas inlet of the vessel while constricting the outlet gas flow using a pressure regulating valve. The gas flow rate was controlled using a mass flow controller positioned upstream of the reservoir. A pressure relief valve was used to prevent overpressurizing the GC. The pressurized liquid electrolyte was pumped to the electrolyzer and continuously recycled to the vessel. Digital pressure indicators positioned at the inlet and outlet of the electrolyzer were used to measure the system pressure and pressure drop across the cathode compartment. Gas chromatography measurements were taken after 10 minutes of electrolysis. No liquid products were detected by 1H NMR. Therefore, the $FE_{CO}$ and $FE_{H2}$ were normalized to 100% for every experiment. These normalized FE values obtained at 1 atm with our pressurized bicarbonate electrolyzer test station matched that of the experiments performed at ambient conditions, which confirms that the normalized values are accurate. Pressurizing the bicarbonate feedstock, p, may maximize the concentration of dissolved CO$_2$ near the catalyst surface. Increasing the pressure of the bicarbonate feedstock may increase CO$_2$RR rates by increasing the rate of CO$_2$ mass transfer from the gas to the electrolyte, $R_{MT, CO2}$ (Eq. S3).

$$R_{MT,CO_2} = k_{GL,CO_2} M_{CO_2}(H_{CO_2} p y_{CO_2} - c_{CO_2(aq)}) \quad \text{Eq. S3}$$

where $H_{CO2}$ is the Henry's constant for CO$_2$, $y_{CO2}$ is the mass fraction of CO$_2$ in the gas bubbles, and $c_{CO2}$(aq) is the CO$_2$ concentration in the electrolyte. The gas-to-liquid mass-transfer coefficient of CO2, $k_{GL,CO2}$ is given by Eq. S4:

$$k_{GL,CO_2} = \frac{D_{CO_2(aq)}}{\delta_{TF}} \quad \text{Eq. S4}$$

where $D_{(CO2\ (aq))}$ is the diffusion coefficient of CO$_2$ in the liquid electrolyte, and $\delta_{TF}$ is the thickness of the thin film of electrolyte on the surface of the electrode.

Energy Efficiency (EE) Calculation

The EE is a measure of the overall energy utilization toward the desired product (e.g., CO). It can be calculated by Eq. S2A:

$$EE_{CO} = (E_{CO} \times FE_{CO})/\text{cell voltage} \quad \text{Eq. S2A}$$

$EE_{CO}$ is the thermodynamic onset voltage for CO$_2$ to CO (1.34 V).

Technoeconomic Analysis

To benchmark the commercial feasibility of an electrolyzer as described herein, we performed a technoeconomic analysis (TEA) to compare the 20-year net present value (NPV) of an electrolyzer as described herein including a control system, and gaseous CO$_2$-fed electrolyzer facility with an installed capacity of 100 tons CO/day. The TEA considers operational and capital expenditures and is based on a TEA previously reported by Jiao and coworkers. We listed the parameters of the three electrolyzers we used in Table S1, and assumed these electrolyzers work for a duration of 20 years with 2 weeks of downtime for maintenance per year. The NPV was calculated using a discounted cash flow analysis with a nominal interest rate of 10% and an income tax rate of 38.9%. As per the DOE's H2A analysis for water electrolysis, a modified accelerated cost recovery system (MACRS) was used with a working capital equal to 5% of the capital costs and a 10-year depreciation lifetime with a 20% salvage value at the end of 20 years. All dollar values are reported in present-day US dollars.

TABLE S1

Parameters used in the TEA for three electrolyzers.

| Electrolyzers | $FE_{CO}$ (%) | $V_{cell}$ (V) | J (mA cm$^{-2}$) | CO$_2$ utilization value (%) |
|---|---|---|---|---|
| Title electrolyzer | 70 | 2.5 | 100 | 33.3 |
| Control system | 60 | 3.6 | 100 | 33.3 |
| Gaseous-fed CO$_2$ electrolyzer | 90 | 2 | 200 | 16.7 |

Capital Costs

The active area required for each electrolyzer to produce 100 tons/day of CO was determined by a mass balance using the current densities and $FE_{CO}$ values shown in Table S1. An installed cost of $920/m$^2$ was then used to determine the electrolyzer capital costs ($10.5 million for the title electrolyzer; $12.2 million for the control system; and $4.1 million for the gaseous-fed CO$_2$ electrolyzer). The capital costs for the balance of plant were assumed to be 35% of the electrolyzer capital costs.

Operating Costs

Bicarbonate electrolysis can bypass CO$_2$ regeneration in the CO$_2$ capture process. We therefore estimated the price of bicarbonate feedstock based on the cost of CO$_2$ capture from flue gas without the operating and capital costs associated with CO$_2$ stripping. CO$_2$ stripping constitutes a majority of the operating costs (∞80%) due to the large associated heat duty. In terms of capital costs, the stripper and reboiler accounts for 21% of the capital costs (the absorber is much more capital-intensive). The operating costs were estimated to be 71% of the total costs of CO$_2$ capture. On this basis, we estimated the cost of bicarbonate for an assumed $CO_2$ capture cost of $70/ton (Eq. S3A):

$$C_{bicarbonate,total} =$$

$$C_{bicarbonate,opex} + C_{bicarbonate,capex} = 0.2 C_{CO_2,opex} + 0.79 C_{CO_2,capex} =$$

$$0.2(0.71 C_{CO_2,total}) + 0.79(0.29 C_{CO_2,total}) = 0.37 C_{CO_2,total} =$$

$$0.37\left(\frac{\$70}{\text{ton } CO_2}\right) \times \frac{1 \text{ ton } CO_2}{1000 \text{ kg } CO_2} \times \frac{44.01 \text{ kg } CO_2}{1 \text{ kmol } CO_2} \times$$

$$\frac{1 \text{ kmol } CO_2}{1 \text{ kmol } HCO_3^-} \times \frac{1 \text{ kmol } HCO_3^-}{100.11 \text{ kg } HCO_3^-} = \frac{\$11}{\text{ton } HCO_3^-}$$

Eq. S3A

For every mole of CO produced, 1 mole of $CO_2$ is electrochemically reduced in the electrolyzer. However, our experimental data shows that >50% of the $CO_2$ fed to the electrolyzer (in the form of bicarbonate) remains unreacted at the outlet of the electrolyzer. Therefore, 1 mole of $CO_2$ must be captured and 1 mole of $CO_2$ must be separated and recycled from the product stream for every mole of CO produced. For simplicity, we assumed that the cost of separating and recycling the unreacted $CO_2$ in the syngas is the same as the cost to capture $CO_2$.

The total current required to produce 100 tons/day of CO was determined using Faraday's law of electrolysis. Power consumption was calculated assuming a cell potential of 2.5 V. The annual cost of electricity was then determined for an electricity price of $0.03/kWh. This price was chosen based on projections for renewable electricity costs in 2030. Maintenance costs were assumed to be 2.5% of the electrolyzer capital expense and water costs were assumed to be $0.0054/gal.

The market price of CO was taken as $0.6/kg. $H_2$ produced at the cathode was assumed to supplant a fraction of the H2 that must be purchased to supply the anode HOR. Based on these assumptions, the breakeven cost of hydrogen was determined to be $2.32/kg (i.e., for a market price of $H_2 < 2.32$/kg the NPV is positive). For this scenario, the total operating costs were determined to be $52,000/day.

Membrane Thickness

Nafion membrane thickness can modulate ion transport and in turn the selectivity: the $H^+$ transfer number (i.e., the ratio of $H^+$ as the charge carrier to the total current) is expected to increase when membrane thickness is increased from 25 to 50 µm (Eq. S4A). i-$CO_2$ generation is limited by the proton transport at J≤300 mA cm$^{-2}$; therefore, the title electrolyzer with a 50-µm membrane showed a higher i-$CO_2$ flow rate (6.79 sccm) compared to the one with a 25-µm membrane (5.46 sccm) at 100 mA cm$^{-2}$, and in turn the $FE_{CO}$ values were higher (47% c.f. 43%). Instead of proton transport, the i-$CO_2$ generation is limited by $HCO_3^-$ transport at J≥500 mA cm$^{-2}$; therefore, the $H^+$ transfer number showed a negligible effect on the selectivity.

$$t_{proton} = i_{H+}/i_{total} = N_{H+}/\sum(|Z_i|N_i)$$

Eq. S4A $t_{proton}$ represents the $H^+$ transfer number; $i_{H+}$ represents proton current density and $i_{total}$ represents total current density. $N_{H+}$ is proton molar flux ratio and Z is the charge number.

Net $CO_2$ Emissions

We calculated the net $CO_2$ emissions when using the title electrolyzer to reduce $CO_2$ emissions, with the $H_2$ sourced from natural gas. Natural gas reforming is currently the main $H_2$ production technology, and life cycle assessment results showed that every kg $H_2$ (500 mol) production leads to 7 kg $CO_2$ (159 mol) emissions on average. In the electrolyzer, the overall reaction is:

$$H_{2(g)} + CO_{2(g)} \rightarrow CO_{(g)} + H_2O_{(l)}$$

Eq. S5A

Therefore, 159 mol $H_2$ are needed to eliminate the produced $CO_2$ from the upstream natural gas reforming process assuming $H_2$ utilization is 100%. The breakeven $H_2$ utilization for this process to be carbon-neutral is 31.8%.

The following documents describe related technologies. Embodiments of the present technology may incorporate features as described in these references. All of the following references are hereby incorporated herein by reference as if fully set forth herein for all purposes.

1. Weekes, D. M., Salvatore, D. A., Reyes, A., Huang, A. & Berlinguette, C. P. Electrolytic $CO_2$ Reduction in a Flow Cell. *Acc. Chem. Res.* 51, 910-918 (2018).
2. Whipple, D. T. & Kenis, P. J. A. Prospects of $CO_2$ Utilization via Direct Heterogeneous Electrochemical Reduction. *J. Phys. Chem. Lett.* 1, 3451-3458 (2010).
3. Hori, Y. Electrochemical $CO_2$ Reduction on Metal Electrodes. in *Modern Aspects of Electrochemistry* (eds. Vayenas, C. G., White, R. E. & Gamboa-Aldeco, M. E.) 89-189 (Springer New York, 2008).
4. Nitopi, S. et al. Progress and Perspectives of Electrochemical $CO_2$ Reduction on Copper in Aqueous Electrolyte. *Chem. Rev.* 119, 7610-7672 (2019).
5. Salvatore, D. & Berlinguette, C. P. Voltage Matters When Reducing $CO_2$ in an Electrochemical Flow Cell. *ACS Energy Letters* 5, 215-220 (2019).
6. Spurgeon, J. M. & Kumar, B. A comparative technoeconomic analysis of pathways for commercial electrochemical $CO_2$ reduction to liquid products. *Energy Environ. Sci.* 11, 1536-1551 (2018).
7. Jouny, M., Luc, W. & Jiao, F. General Techno-Economic Analysis of $CO_2$ Electrolysis Systems. *Ind. Eng. Chem. Res.* 57, 2165-2177 (2018).
8. De Luna, P. et al. What would it take for renewably powered electrosynthesis to displace petrochemical processes? *Science* 364, eaav3506 (2019).
9. Arguer, F. P. G. de et al. $CO_2$ electrolysis to multicarbon products at activities greater than 1 A cm$^{-2}$. *Science* 367 661-666 (2020).
10. Zhang, X. et al. Molecular engineering of dispersed nickel phthalocyanines on carbon nanotubes for selective $CO_2$ reduction. *Nature Energy* (2020) doi:10.1038/s41560-020-0667-9.
11. Chen, X. et al. Electrochemical $CO_2$-to-ethylene conversion on polyamine-incorporated Cu electrodes. *Nature Catalysis* (2020) doi:10.1038/s41929-020-00547-0.
12. Ren, S. et al. Molecular electrocatalysts can mediate fast, selective $CO_2$ reduction in a flow cell. *Science* 365, 367-369 (2019).
13. Chen, Y. et al. A Robust, Scalable Platform for the Electrochemical Conversion of $CO_2$ to Formate: Identifying Pathways to Higher Energy Efficiencies. *ACS Energy Lett.* 5, 1825-1833 (2020).
14. Endrődi, B. et al. High carbonate ion conductance of a robust PiperION membrane allows industrial current density and conversion in a zero-gap carbon dioxide electrolyzer cell. *Energy Environ. Sci.* 13, 4098-4105 (2020).
15. Keith, D. W., Holmes, G., St. Angelo, D. & Heidel, K. A Process for Capturing $CO_2$ from the Atmosphere. *Joule* 2, 1573-1594 (2018).

16. Smith, W. A., Burdyny, T., Vermaas, D. A. & Geerlings, H. Pathways to Industrial-Scale Fuel Out of Thin Air from $CO_2$ Electrolysis. *Joule* 3, 1822-1834 (2019).
17. Luyben, W. L. Capital cost of compressors for conceptual design. *Chemical Engineering and Processing—Process Intensification* 126, 206-209 (2018).
18. Larrazábal, G. O. et al. Analysis of Mass Flows and Membrane Cross-over in $CO_2$ Reduction at High Current Densities in an MEA-Type Electrolyzer. *ACS Appl. Mater. Interfaces* 11, 41281-41288 (2019).
19. Ma, M. et al. Insights into the carbon balance for $CO_2$ electroreduction on Cu using gas diffusion electrode reactor designs. *Energy Environ. Sci.* 13, 977-985 (2020).
20. Rabinowitz, J. A. & Kanan, M. W. The future of low-temperature carbon dioxide electrolysis depends on solving one basic problem. *Nat. Commun.* 11, 5231 (2020).
21. Jeng, E. & Jiao, F. Investigation of $CO_2$ single-pass conversion in a flow electrolyzer. *Reaction Chemistry & Engineering* 5, 1768-1775 (2020).
22. Welch, A. J., Dunn, E., DuChene, J. S. & Atwater, H. A. Bicarbonate or Carbonate Processes for Coupling Carbon Dioxide Capture and Electrochemical Conversion. *ACS Energy Letters* 5, 940-945 (2020).
23. Li, T. et al. Electrolytic Conversion of Bicarbonate into CO in a Flow Cell. *Joule* 3, 1487-1497 (2019).
24. Lees, E. W. et al. Electrodes Designed for Converting Bicarbonate into CO. *ACS Energy Letters* 5, 2165-2173 (2020).
25. Zhang, Z. et al. pH Matters When Reducing $CO_2$ in an Electrochemical Flow Cell. *ACS Energy Lett.* 5, 3101-3107 (2020).
26. Li, T., Lees, E. W., Zhang, Z. & Berlinguette, C. P. Conversion of Bicarbonate to Formate in an Electrochemical Flow Reactor. *ACS Energy Lett.* 2624-2630 (2020).
27. Ripatti, D. S., Veltman, T. R. & Kanan, M. W. Carbon Monoxide Gas Diffusion Electrolysis that Produces Concentrated C2 Products with High Single-Pass Conversion. *Joule* 3, 240-256 (2019).
28. Li, Y. C. et al. Electrolysis of $CO_2$ to Syngas in Bipolar Membrane-Based Electrochemical Cells. *ACS Energy Lett.* 1, 1149-1153 (2016).
29. Zhang, Z. et al. Metallic Porous Electrodes Enable Efficient Bicarbonate Electrolysis. doi:10.26434/chemrxiv.12891071.v1.
30. Li, Y. C. et al. $CO_2$ Electroreduction from Carbonate Electrolyte. *ACS Energy Lett.* 4, 1427-1431 (2019).
31. Luo, J. et al. Bipolar membrane-assisted solar water splitting in optimal pH. *Advanced Energy Materials* 6, 1600100 (2016).
32. Na, J. et al. General technoeconomic analysis for electrochemical coproduction coupling carbon dioxide reduction with organic oxidation. *Nature Communications* 10, 5193 (2019).
33. Han, X. et al. Electrocatalytic Oxidation of Glycerol to Formic Acid by $CuCo_2O_4$ Spinel Oxide Nanostructure Catalysts. *ACS Catal.* 10, 6741-6752 (2020).
34. Li, T., Cao, Y., He, J. & Berlinguette, C. P. Electrolytic $CO_2$ Reduction in Tandem with Oxidative Organic Chemistry. *ACS Cent Sci* 3, 778-783 (2017).
35. Verma, S., Lu, S. & Kenis, P. J. A. Co-electrolysis of $CO_2$ and glycerol as a pathway to carbon chemicals with improved technoeconomics due to low electricity consumption. *Nature Energy* 4, 466 (2019).
36. Xia, C. et al. Continuous production of pure liquid fuel solutions via electrocatalytic $CO_2$ reduction using solid-electrolyte devices. *Nature Energy* 4, 776-785 (2019).
37. Fan, L., Xia, C., Zhu, P., Lu, Y. & Wang, H. Electrochemical $CO_2$ reduction to high-concentration pure formic acid solutions in an all-solid-state reactor. *Nat. Commun.* 11, 3633 (2020).
38. Salvatore, D. A. et al. Electrolysis of Gaseous $CO_2$ to CO in a Flow Cell with a Bipolar Membrane. *ACS Energy Lett.* 3, 149-154 (2018).
39. Yan, Z., Hitt, J. L., Zeng, Z., Hickner, M. A. & Mallouk, T. E. Improving the efficiency of $CO_2$ electrolysis by using a bipolar membrane with a weak-acid cation exchange layer. *Nat. Chem.* 13, 33-40 (2020).
40. Lee, D.-Y., Elgowainy, A. & Dai, Q. Life cycle greenhouse gas emissions of hydrogen fuel production from chlor-alkali processes in the United States. *Appl. Energy* 217, 467-479 (2018).
41. Zhang, S. Prediction of selling price of hydrogen produced from methanol steam reforming. *Energy Sources Part B: Econ. Plan. Policy* 13, 28-32 (2018).
42. Kayfeci, M., Keçebaş, A. & Bayat, M. Hydrogen production. *Solar Hydrogen Production* 45-83 (2019) doi:10.1016/b978-0-12-814853-2.00003-5.
43. Shen, K.-Y., Park, S. & Kim, Y.-B. Hydrogen utilization enhancement of proton exchange membrane fuel cell with anode recirculation system through a purge strategy. *Int. J. Hydrogen Energy* 45, 16773-16786 (2020).
44. Woo, C. H. & Benziger, J. B. PEM fuel cell current regulation by fuel feed control. *Chem. Eng. Sci.* 62, 957-968 (2007).
45. Salvatore, D. A. et al. Electrolysis of Gaseous $CO_2$ to CO in a Flow Cell with a Bipolar Membrane. *ACS Energy Lett.* 3, 149-154 (2018).
46. Liu, M. et al. Improved WATERGATE Pulse Sequences for Solvent Suppression in NMR Spectroscopy. *J. Magn. Reson.* 132, 125-129 (1998).
47. Jhong, H.-R. 'molly', Ma, S. & Kenis, P. J. A. Electrochemical conversion of $CO_2$ to useful chemicals: current status, remaining challenges, and future opportunities. *Curr. Opin. Chem. Eng.* 2, 191-199 (2013).
48. Orella, M. J., Brown, S. M., Leonard, M. E., Román-Leshkov, Y. & Brushett, F. R. A General Technoeconomic Model for Evaluating Emerging Electrolytic Processes. *Energy Technology* 1900994 (2019).
49. Steward, D., Ramsden, T. & Zuboy, J. H2A Central Hydrogen Production Model, Version 3 User Guide (DRAFT). *National Renewable Energy Laboratory* (2012).
50. Jouny, M., Luc, W. & Jiao, F. General Techno-Economic Analysis of $CO_2$ Electrolysis Systems. *Ind. Eng. Chem. Res.* 57, 2165-2177 (2018).
51. Welch, A. J., Dunn, E., DuChene, J. S. & Atwater, H. A. Bicarbonate or Carbonate Processes for Coupling Carbon Dioxide Capture and Electrochemical Conversion. *ACS Energy Letters* 5, 940-945 (2020).
52. Rochelle, G. T. et al. $CO_2$ Capture by Absorption with Potassium Carbonate Third Quarterly Report 2006. Austin, TX (2006).
53. Abu-Zahra, M. R. M., Niederer, J. P. M., Feron, P. H. M. & Versteeg, G. F. $CO_2$ capture from power plants: Part II. A parametric study of the economical performance based on mono-ethanolamine. *Int. J. Greenhouse Gas Control* 1, 135-142 (2007).

54. Raksajati, A., Ho, M. T. & Wiley, D. E. Reducing the Cost of $CO_2$ Capture from Flue Gases Using Aqueous Chemical Absorption. *Ind. Eng. Chem. Res.* 52, 16887-16901 (2013).
55. Ho, M. T., Allinson, G. W. & Wiley, D. E. Factors affecting the cost of capture for Australian lignite coal fired power plants. *Energy Procedia* 1, 763-770 (2009).
56. Haegel, N. M. et al. Terawatt-scale photovoltaics: Trajectories and challenges. *Science* 356, 141-143 (2017).
57. Ripatti, D. S., Veltman, T. R. & Kanan, M. W. Carbon Monoxide Gas Diffusion Electrolysis that Produces Concentrated C2 Products with High Single-Pass Conversion. *Joule* 3, 240-256 (2019).
58. Soltani, R., Rosen, M. A. & Dincer, I. Assessment of $CO_2$ capture options from various points in steam methane reforming for hydrogen production. *Int. J. Hydrogen Energy* 39, 20266-20275 (2014).
59. Dufek, E. J., Lister, T. E., Stone, S. G. & McIlwain, M. E. Operation of a Pressurized System for Continuous Reduction of $CO_2$. *J. Electrochem. Soc.* 159, F514 (2012).
60. Delacourt, C., Ridgway, P. L., Kerr, J. B. & Newman, J. Design of an electrochemical cell making syngas (CO+$H_2$) from $CO_2$ and $H_2O$ reduction at room temperature. *Journal of the Electrochemical Society* 155, B42 (2007).
61. Li, T. et al. Electrolytic Conversion of Bicarbonate into CO in a Flow Cell. *Joule* 3, 1487-1497 (2019).
62. Lees, E. W. et al. Electrodes Designed for Converting Bicarbonate into CO. *ACS Energy Letters* 2165-2173 (2020) doi:10.1021/acsenergylett.0c00898.
63. Li, T., Lees, E. W., Zhang, Z. & Berlinguette, C. P. Conversion of Bicarbonate to Formate in an Electrochemical Flow Reactor. *ACS Energy Lett.* 2624-2630 (2020).
64. Li, Y. C. et al. Electrolysis of $CO_2$ to Syngas in Bipolar Membrane-Based Electrochemical Cells. *ACS Energy Lett.* 1, 1149-1153 (2016).
65. Zhang, Z. et al. Metallic Porous Electrodes Enable Efficient Bicarbonate Electrolysis. doi:10.26434/chemrxiv.12891071.v1.
66. Li, Y. C. et al. $CO_2$ Electroreduction from Carbonate Electrolyte. *ACS Energy Lett.* 4, 1427-1431 (2019).
67. Arguer, F. P. G. de et al. $CO_2$ electrolysis to multicarbon products at activities greater than 1 A cm−2. *Science vol.* 367 661-666 (2020).
68. Yin, Z. et al. An alkaline polymer electrolyte $CO_2$ electrolyzer operated with pure water. *Energy Environ. Sci.* 12, 2455-2462 (2019).
69. Chen, Y. et al. A Robust, Scalable Platform for the Electrochemical Conversion of $CO_2$ to Formate: Identifying Pathways to Higher Energy Efficiencies. *ACS Energy Lett.* 5, 1825-1833 (2020).
70. Verma, S., Lu, X., Ma, S., Masel, R. I. & Kenis, P. J. A. The effect of electrolyte composition on the electroreduction of $CO_2$ to CO on Ag based gas diffusion electrodes. *Phys. Chem. Chem. Phys.* 18, 7075-7084 (2016).
71. Li, F. et al. Cooperative $CO_2$-to-ethanol conversion via enriched intermediates at molecule-metal catalyst interfaces. *Nat. Catal.* 3, 75-82 (2020).
72. Li, F. et al. Molecular tuning of $CO_2$-to-ethylene conversion. *Nature* 577, 509-513 (2020).
73. Zhang, Z. et al. pH Matters When Reducing $CO_2$ in an Electrochemical Flow Cell. *ACS Energy Lett.* 5, 3101-3107 (2020).

Interpretation of Terms

Unless the context clearly requires otherwise, throughout the description and the claims: "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value ±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;
in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for performing a carbon dioxide reduction reaction in an electrolyzer, the method comprising:
    applying an electrical potential between an anode and a cathode;
    introducing hydrogen gas at the anode;
    supplying an aqueous solution comprising bicarbonate ions at the cathode, wherein the aqueous solution is substantially free of gaseous carbon dioxide;
    oxidizing, at the anode, the hydrogen gas to form hydrogen ions;
    transporting the hydrogen ions from the anode through an ion exchange membrane toward the cathode; and
    reacting the hydrogen ions with the bicarbonate ions at the cathode to yield one or more products.

2. The method as defined in claim 1, comprising increasing a pressure of the aqueous solution at the cathode.

3. The method as defined in claim 2, wherein the pressure of the aqueous solution is increased by supplying a source of gas to a reservoir containing the aqueous solution.

4. The method as defined in claim 2 comprising maintaining the pressure of the aqueous solution at the cathode within a range of from 1.1 atm to 40 atm.

5. The method as defined in claim 1, wherein the pH of the aqueous solution is greater than about 4.

6. The method as defined in claim 1, wherein a concentration of the biocarbonate ions in the aqueous solution is in the range of from 0.1 to 10 M.

7. The method as defined in claim 1, wherein the one or more products comprise no more than 50% CO2.

8. The method as defined in claim 1, wherein the one or more products comprise a gaseous product or a liquid product.

9. The method as defined in claim 1, wherein the one or more products comprise a carbon-containing compound.

10. The method as defined in claim 9, wherein the carbon-containing compound comprises one or more of formate, carbon monoxide, formic acid, ethylene and propanol.

11. The method as defined in claim 1, further comprising:
    discharging excess hydrogen gas out of the anode; and
    delivering the excess hydrogen gas into the anode.

12. The method as defined in claim 1, further comprising transporting the hydrogen ions through a buffer layer after being transported through the ion exchange membrane and before entering a cathode chamber comprising the cathode.

13. The method as defined in claim 1, wherein the aqueous solution comprises potassium bicarbonate, caesium bicarbonate, and/or ammonium bicarbonate.

14. The method as defined in claim 1, wherein the one or more products comprise hydrogen gas.

15. The method as defined in claim 14, further comprising delivering the hydrogen gas produced at the cathode to the anode.

16. The method as defined in claim 15, further comprising separating the hydrogen gas from the one or more products prior to delivering the hydrogen gas to the anode.

\* \* \* \* \*